US012608823B1

(12) United States Patent
Bixler et al.

(10) Patent No.:     US 12,608,823 B1
(45) Date of Patent:     *Apr. 21, 2026

(54) METHOD OF ANALYZING THREE DIMENSIONAL EJECTA WITH DEPTH CHARACTERISTICS

(71) Applicant: Government of the United States, as represented by the Secretary of the Air Force, Wright-Patterson AFB, OH (US)

(72) Inventors: Joel Bixler, San Antonio, TX (US); Allen Kiester, San Antonio, TX (US); Gary Noojin, Universal City, TX (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 513 days.

This patent is subject to a terminal disclaimer.

(21) Appl. No.: 18/339,029

(22) Filed: Jun. 21, 2023

Related U.S. Application Data

(60) Provisional application No. 63/440,673, filed on Jan. 23, 2023, provisional application No. 63/381,094, filed on Oct. 26, 2022.

(51) Int. Cl.
    *G06T 7/246*          (2017.01)
(52) U.S. Cl.
    CPC .... *G06T 7/251* (2017.01); *G06T 2207/10021* (2013.01); *G06T 2207/20212* (2013.01)

(58) Field of Classification Search
    CPC .......... G06T 7/251; G06T 2207/10021; G06T 2207/20212
    See application file for complete search history.

(56) References Cited

U.S. PATENT DOCUMENTS

| 12,223,662 B1 * | 2/2025 | Bixler .................... H04N 23/95 |
| 2022/0198611 A1 * | 6/2022 | Jia ...................... H04N 1/00132 |

* cited by examiner

*Primary Examiner* — Gregory A Morse
*Assistant Examiner* — Renae A Bitor
(74) *Attorney, Agent, or Firm* — AFMCLO/JAZ; Larry L. Huston

(57)          ABSTRACT

A method of analyzing one or three dimensional ejecta, including depth information, volume, mass and kinematic properties, resulting from a dynamic event. The method comprising using a single trigger, single image sensor three dimensional photography system comprising a first plurality of pulsed laser beams, a stage for the dynamic event to occur and be observed and where the first plurality of pulsed laser beams converge. The laser beams are recombined into a single pulsed laser beam after the stage for capture on the single image sensor to a subframe for each pulsed laser beam, the subframes being combined into a unique frame for each time step. Each static frame becomes a frame in a video of the event where dT is controlled by the laser repetition rate. The frames are analyzed with respect to time to determine the displacement, velocity and/or acceleration thereof. Plural N×N×M arrays of N×M pixels taken from the image sensor are combined to create a three dimensional image of each desired ejectum.

20 Claims, 15 Drawing Sheets

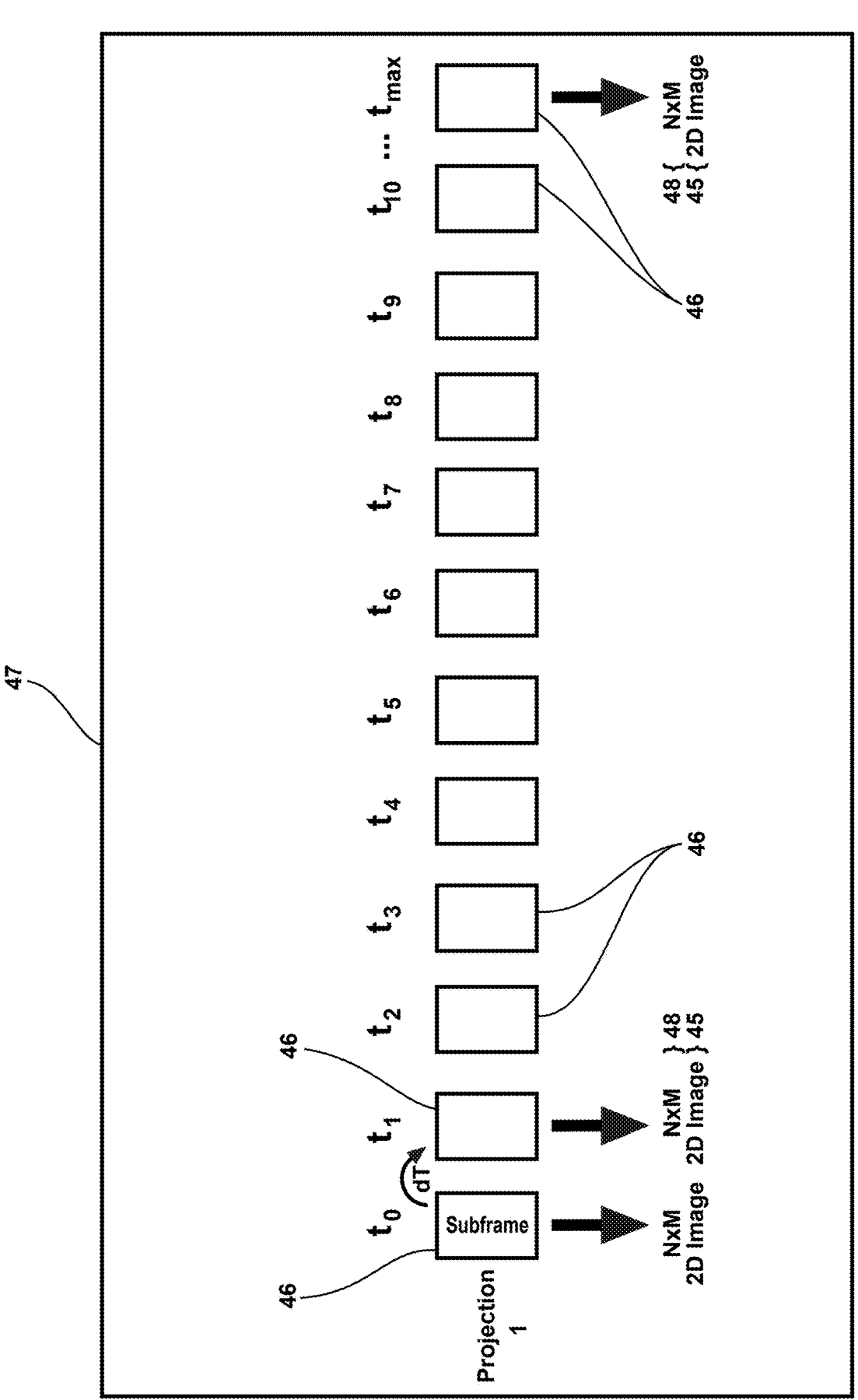
FIG. 2A1

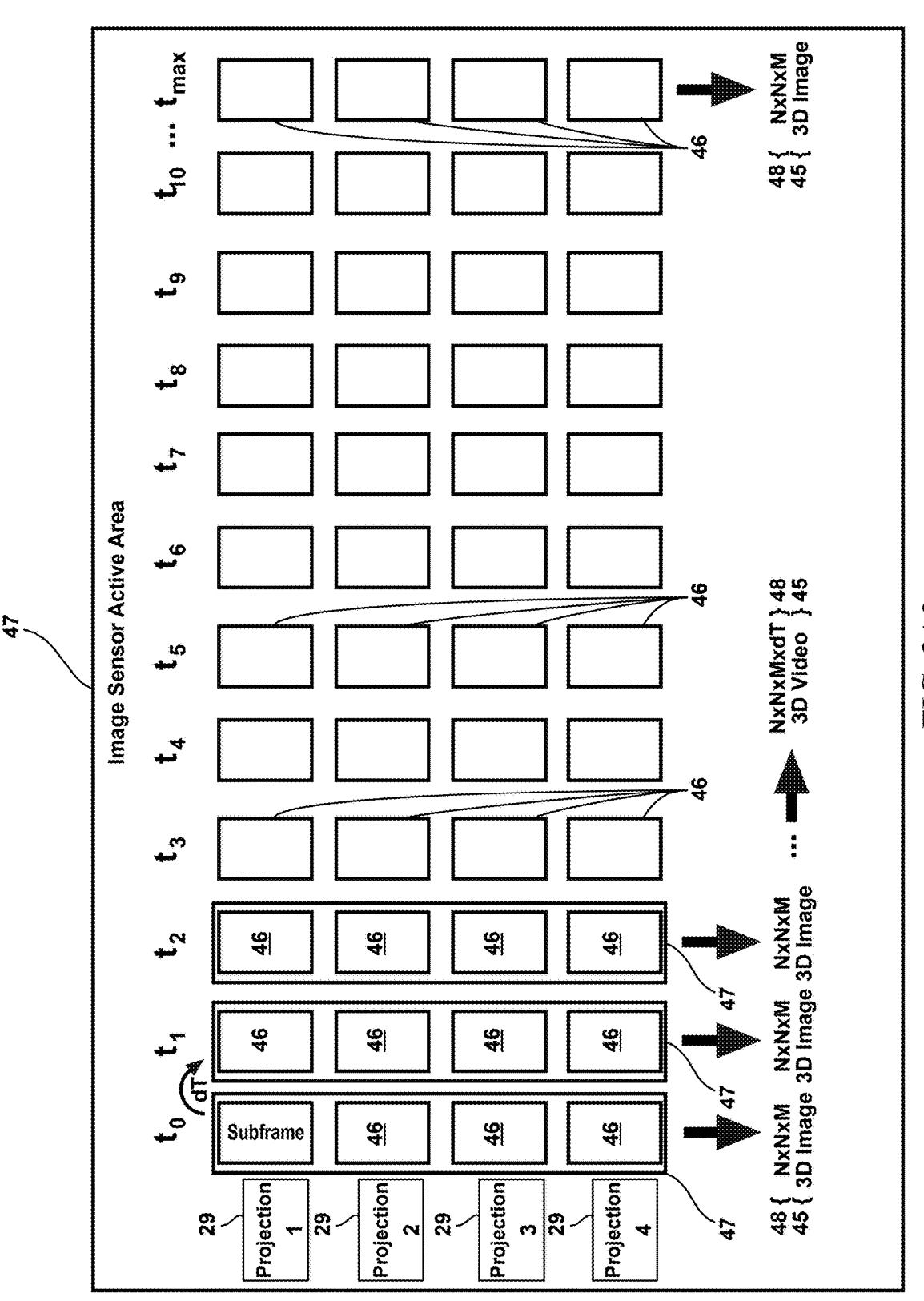
FIG. 2A2

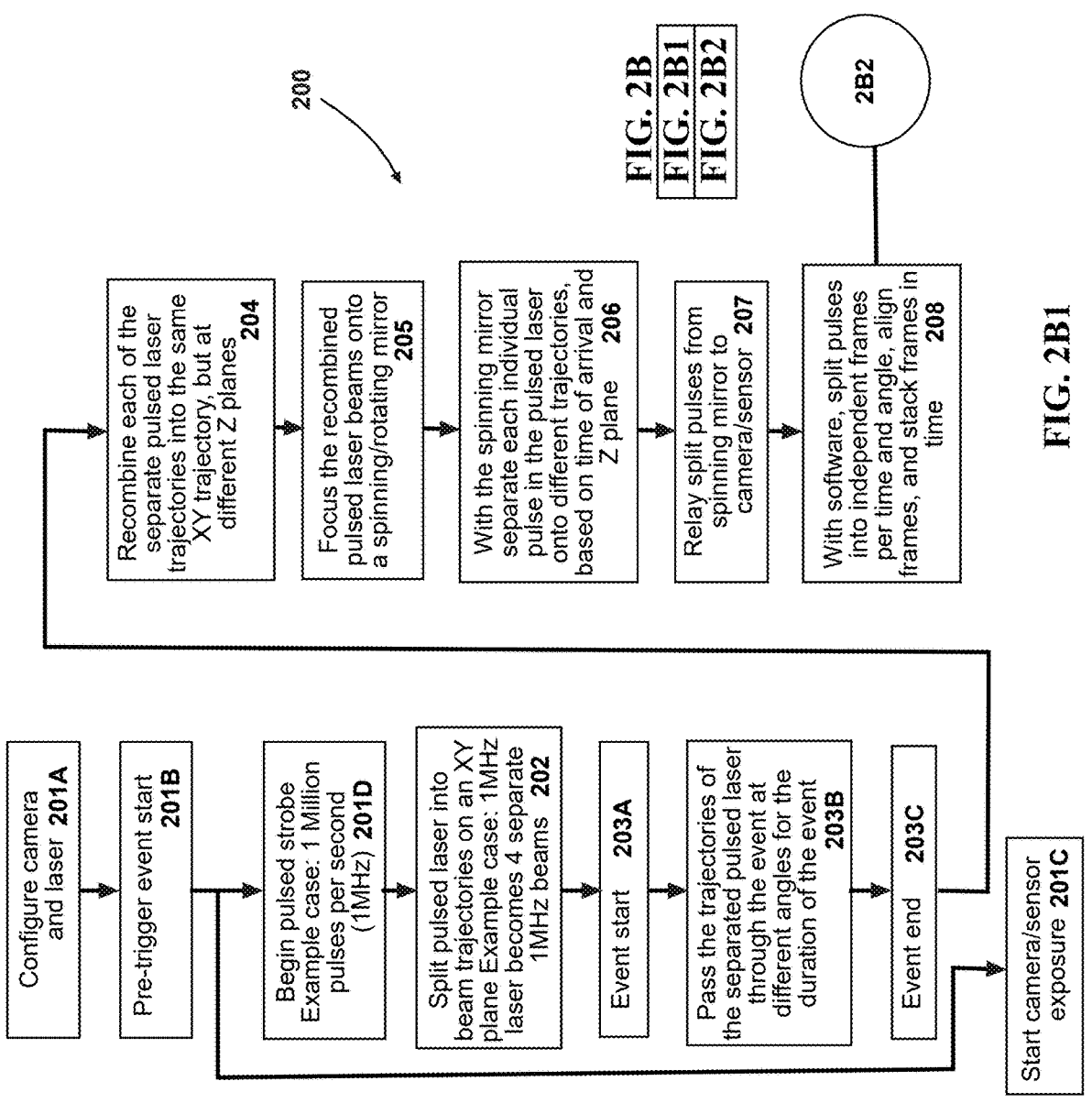
FIG. 2B1

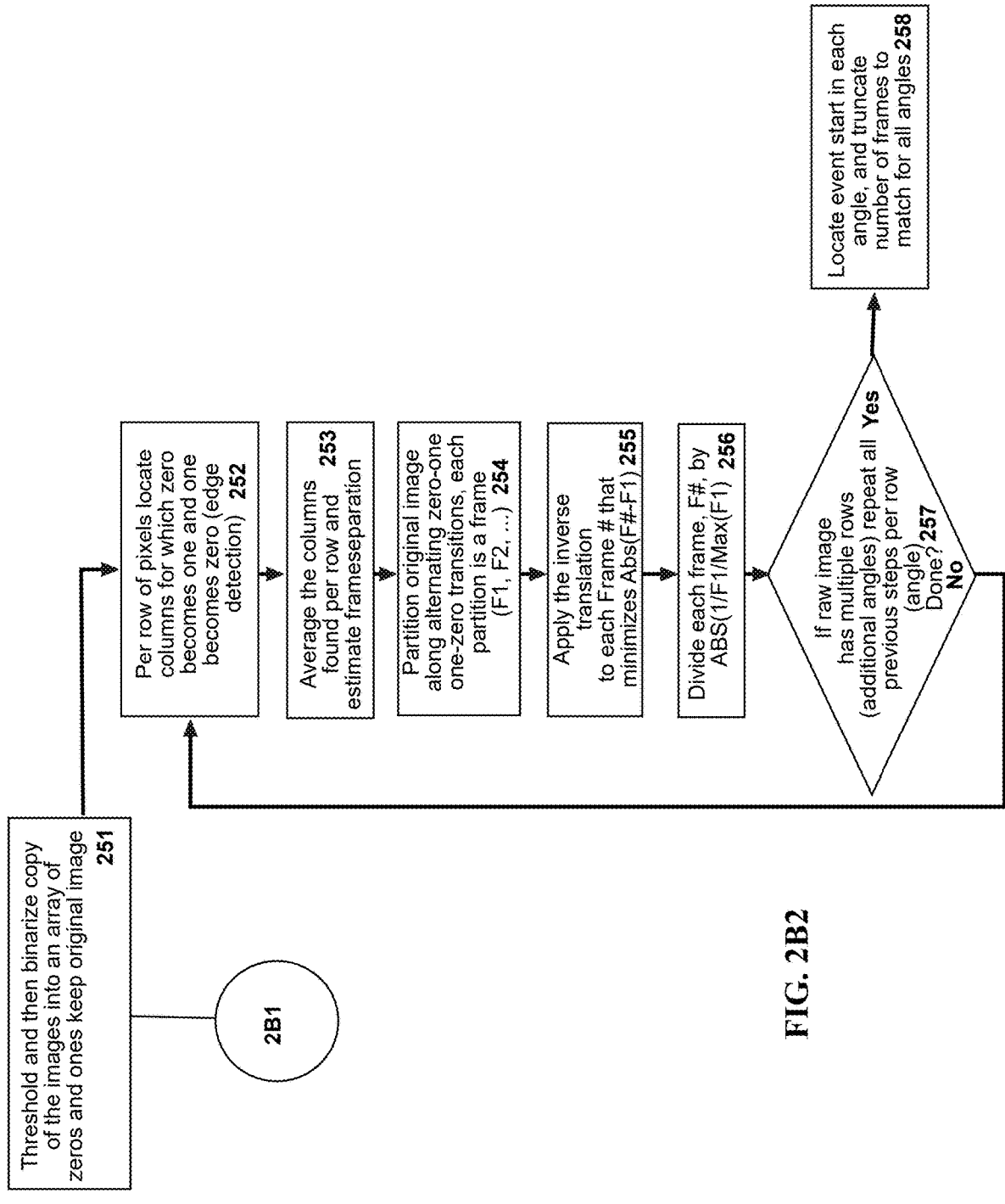

Threshold and then binarize copy of the images into an array of zeros and ones keep original image 251

2B1

Per row of pixels locate columns for which zero becomes one and one becomes zero (edge detection) 252

Average the columns found per row and estimate frameseparation 253

Partition original image along alternating zero-one one-zero transitions, each partition is a frame (F1, F2, ...) 254

Apply the inverse translation to each Frame # that minimizes Abs(F#-F1) 255

Divide each frame, F#, by ABS(1/F1/Max(F1) 256

If raw image has multiple rows (additional angles) repeat all previous steps per row (angle) Done? 257   Yes   No

Locate event start in each angle, and truncate number of frames to match for all angles 258

FIG. 4A
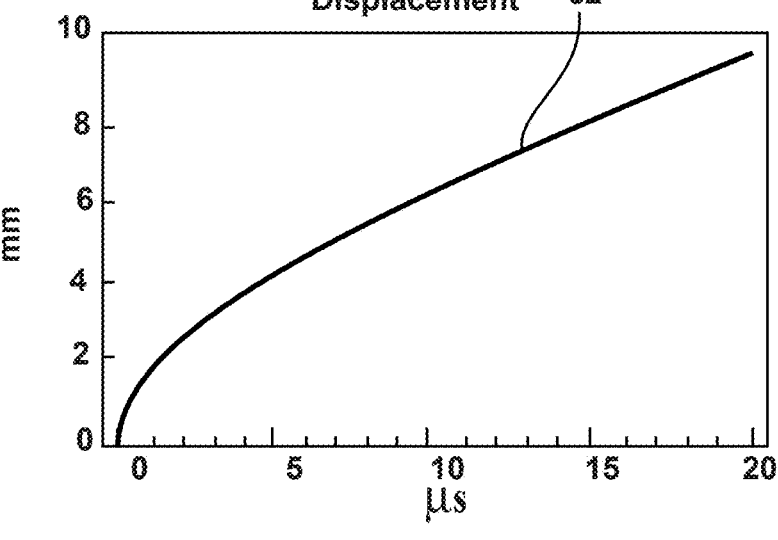
FIG. 4B
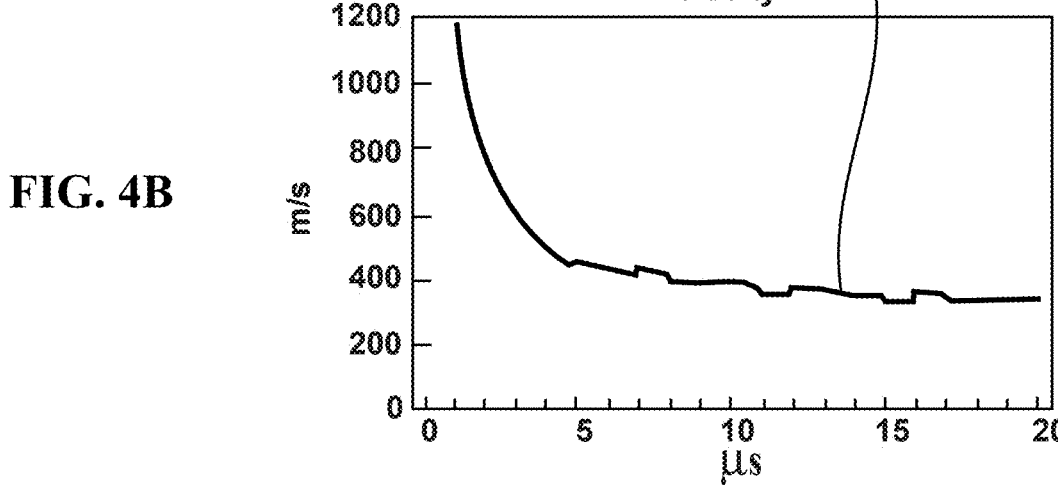
FIG. 4C
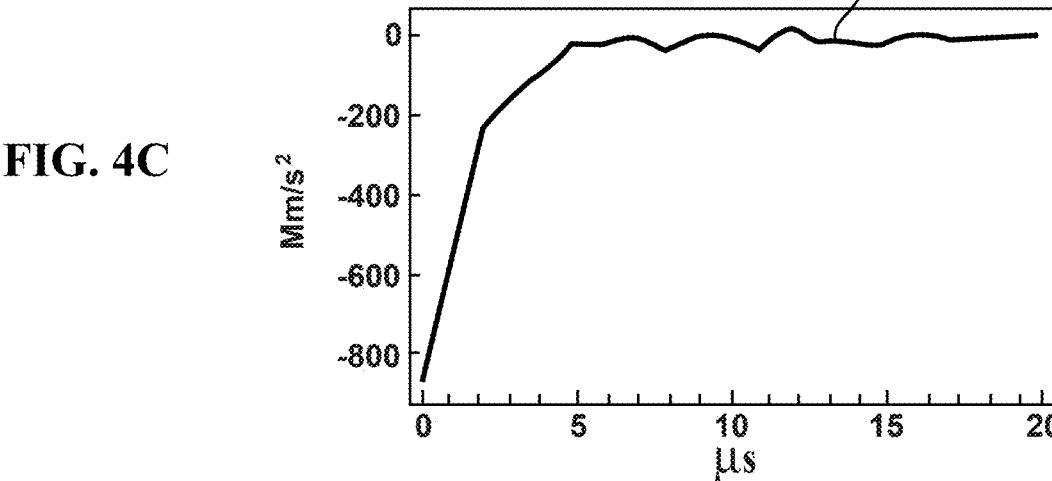

Angle: 0 Deg

Mass estimate: 1.56 mg

Angle: ± 45 DEG

Angle: ±22.5, ± 45 Deg

Mass estimate: 0.75 mg

Mass estimate: 0.497 mg

METHOD OF ANALYZING THREE DIMENSIONAL EJECTA WITH DEPTH CHARACTERISTICS

CROSS REFERENCE TO RELATED APPLICATION

This application claims priority to and the benefit of U.S. provisional patent application Ser. No. 63/381,094 filed Oct. 26, 2022 and priority to and the benefit of U.S. provisional patent application Ser. No. 63/440,673 filed Jan. 23, 2023 the disclosures of which are incorporated herein by reference.

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to analyzing three dimensional ejecta resulting from dynamic events and more particularly to analyzing such three dimensional ejecta using stroboscopic cameras with recombinant split beam lasers for three-dimensional imaging and determination of depth characteristics.

BACKGROUND OF THE INVENTION

In 1926 MIT graduate student Harold Edgerton experimented with xenon flash tubes which could produce high intensity flashes as short as 1E-6 per second. This technology was suitable for photographing drops of milk and tennis balls, but does not provide for multi-angle photography with a single camera or for high speed photography using a single image sensor.

Today, ultrafast imaging is commonly used for recording ultrafast dynamics in physics and biophysics. Examples include single-shot photography recordings of ablation dynamics for biological and nonbiological targets, imaging shock wave dynamics, imaging pressure wave dynamics, visualizing ballistic interaction, imaging flow turbulence for aerodynamics, imaging the effects of kinetic weapons on targets, measuring the mass or density of ejected materials and recording high speed flow via Schlieren imaging.

There are three primary types of high-speed photography: compressed algorithm based methods; high speed sensor cameras and framing cameras. But each of these types of photography has its drawbacks. For example, compressed algorithm methods require expensive custom equipment and complex programming. Imaging artifacts can be introduced into the final rendering due to numerical reconstruction algorithms. High speed sensor cameras can be light starved and are limited as to the number of usable pixels at higher frame rates. Framing cameras are limited to slower frame rates and streak tube framing cameras have generally been discontinued from commercial production.

Elaborating, for charge coupled device (CCD) or complementary metal oxide semiconductor (CMOS) sensor based image detection, the fundamental limit on frame rates is the ability to read out an image captured to the sensor such that the next frame can be recorded combined with on chip storage. This phenomenon results in a maximum frame rate on the order of 10E7 FPS. To overcome this limitation, those of skill in the art have attempted two principal methods to capture dynamics at frame rates that greatly exceed the physical limit of current hardware using a single image sensor: strobe photography and single-shot compressed imaging. Strobe photography temporally utilizes a short illumination pulse to limit the exposure time for a given images which is then captured by a traditional CCD or CMOS detector. Each frame read out from the detector then corresponds to a snapshot in time of the event. By varying the time of triggering between the illumination pulse and the dynamic event of interest, strobe photography can build up a video of the event where the effective frame rate is governed by the timing delay between strobe and event triggers and the exposure time is governed by the duration of the laser pulse. While strobe photography can capture dynamics with sub-nanosecond exposure times and frame rates well exceeding 10E7 FPS, this technique is only useful for recording highly repeatable events.

Compressed imaging utilizes an encoding mask and streak camera to record an image, and compressed sensing algorithms to reconstruct the time sequence (having dimensions of x, y, t where x and y are spatial dimensions and t is time) from a single recorded image. These techniques are prone to image sequences which suffer from encoding artifacts blurring spatial detail and requiring substantial computational resources to render each reconstruction. And reconstruction algorithms often fail to accurately render the dynamics for a scene in which the object of interest is stationary and only changing in intensity or contrast.

Complementary to strobe photography, framing cameras were developed in the early 1960's that achieved frame rates up to 4 MHz. Such camera systems typically utilized a gas turbine powered rotating mirror that spin up to 12 kHz, with up to 80 individual image sensors. A continuous wave light source would illuminate a dynamic scene which was relay imaged to the rotating mirror. Rotation of this mirror would translate this image across each of the 80 individual cameras in the image system capturing unique images, but limiting the total number of frames that are recordable for a given sequence.

Single-shot imaging at frame rates exceeding 10E7 FPS has thus become a topic of enduring interest to the ultrafast imaging community. Such camara systems have been used to record optical phenomena such as reflection, refraction, and fluorescence lifetime emission. High frame rate cameras have been used in medical settings to observe signal propagation along a nerve axon. But commercially available high-speed cameras are limited by the pixel read rates from the associated sensor, and thus disadvantageously trade off reduced pixel number per frame for any increase in frame rates. Framing cameras have a fixed number of fames collected per sequence based on the number of installed detectors within the camera. The frame rates of such cameras are also limited to values governed by multiples of the rotation speed of the spinning mirror such that each subsequent frame falls on one of the individual detectors in the camera. Compressed ultrafast photography (CUP) has the tradeoff of partially sampling the spatial domain to encode some of the image pixels with time domain information.

Compressed imaging has been used in the art to achieve frame rates exceeding 10E7 FPS by utilizing an encoding mask combined with a streak camera to spatially and temporally encode a scene. An entrance slit to the streak camera is fully open, allowing for the full 2D encoded scene to be temporally sheared. The resulting image, and knowledge of the spatio-temporal operators are employed to reconstruct the original x, y, t data cube using iterative shrinkage/ thresholding algorithms used for image deconvolution and restoration. Several limitations are present for compressed reconstruction algorithms. For example, these reconstruction methods are inherently lossy, trading off spatial information for time dynamics. The 2D image read out from the streak camara is fundamentally constrained in the amount of information it can contain, limiting the ability to accurately resolve both space and time post reconstruction. Also, the reconstruction algorithms are computationally costly to perform, requiring sophisticated algorithms and graphical processing unit acceleration to perform in a timely manner.

Another attempt in the art used titled sequentially timed all-optical mapping photography (STAMP) to capture single-shot burst acquisitions. This attempt is limited by the total number of frames based on both the spectral bandwidth of the laser source and area of the detector. STAMP is extremely limited in frame rate tunability as a single spectrally broad laser pulse (femtosecond) is optically chopped into individual pulse packets used to illuminate each frame in the recorded scene. Furthermore, STAMP systems require particularly expensive and custom-made equipment. STAMP systems are also sensitive to alignment and require an expert operator to collect the images.

Yet another attempt in the art is the rotating mirror framing camera available from, e.g. Cordin Company of Salt Lake City, UT. But these camera systems are limited to a fixed number of frames based upon the manufacturer's configuration. A single front optic collects the illumination light, and the rotating mirror along with timing electronics ensure each frame is centered on one of the image sensors contained within the camera. While rotating mirror framing cameras have flexibility in frame rates, the flexibility is limited by the combination of the speed of the rotating mirror and the number of image sensors. Even more significantly, rotating mirror framing cameras cannot accommodate multiple viewing angles of the same scene or event in a single trial. For multiple angle photography, rotating mirror framing camera systems need to record a dedicated and unique video for each angle of interest and then be moved between each trial and be precisely placed to minimize error. Such a process is infeasible for events having low repeatability.

Yet the high speed photographic attempts of the prior art have not been successfully used to analyze ejecta resulting from dynamic events. High speed photography might qualitatively record dynamic events—but fall short of providing adequate quantitative data.

And despite these attempts in the art since the 1920's and the paradigm shift of the framing cameras in the 1960's, the prior art does not teach a device which can enable true three dimensional (3D) recording of ultrafast dynamics with both high frame count and a reasonable number of pixels per frame. The present invention overcomes these disadvantages and provides an optical system capable of recording multiple views of a dynamic scene in a single shot at frame rates exceeding 1 million FPS. By capturing multiple views or projection through a scene, tomographic reconstruction algorithms can be employed to render a true three dimensional view of the dynamics without loss in spatial information.

These three dimensional images can be kinematically analyzed to determine patterns and characteristic of ejecta resulting from dynamic events.

SUMMARY OF THE INVENTION

In one embodiment the invention comprises a method of analyzing at least one three dimensional (3D) ejectum resulting from a dynamic event to determine kinematic properties and depth characteristics including shape, volume and mass. The method comprises the steps of: providing a three dimensional photography system comprising a first plurality of pulsed laser beams, a single trigger therefor, a stage for holding a dynamic event to be observed and whereat the first plurality of pulsed laser beams converge, a recombinant section for combining the first plurality of pulsed laser beams into a single pulsed laser beam after the stage, and a single image sensor for receiving the first plurality of pulsed laser beams as a like plurality of subframes for a second plurality of time steps, wherein each subframe corresponds to a respective to individual pulsed laser beam in each respective time step; combining the first plurality subframes for each time step into a respective frame whereby a second plurality of frames is available; creating a second plurality of $N{\times}N{\times}M$ arrays of $N{\times}M$ pixels for each respective frame; combining the second plurality of $N{\times}N{\times}M$ arrays for each time step to create a three dimensional $N{\times}N{\times}M{\times}dT$ video of a dynamic event observed on the stage; and analyzing the three dimensional $N{\times}N{\times}M{\times}dT$ to video of the dynamic event determine dynamic characteristics of at least one ejectum resulting from the dynamic event. Voxels may be counted and summed to yield the mass of the ejectum.

BRIEF DESCRIPTION OF THE DRAWINGS

FIG. 1C is a fragmentary enlarged view of the recombinant section of FIG. 1B.

FIG. 2A1 is an image sensor diagram for 2D imaging according to the present invention.

FIG. 2A2 is an image sensor diagram for 3D imaging and videography according to the present invention.

FIG. 2 is a flow chart of the steps in the camera operation performing the image acquisition according to the present invention.

FIG. 2B1 is a detailed flowchart of the process of FIG. 2A1.

FIG. 2B2 is a flow chart of a frame alignment algorithm according to the present invention.

FIG. 4A is a graphical relationship of the displacement of the shockwave of FIG. 3.

FIG. 4B is a graphical relationship of the velocity of the shockwave of FIG. 3, and the first derivative of the graph of FIG. 4A.

FIG. 4C is a graphical relationship of the acceleration of the shockwave of FIG. 3, and the first derivative of the graph of FIG. 4B.

Figure 5A:
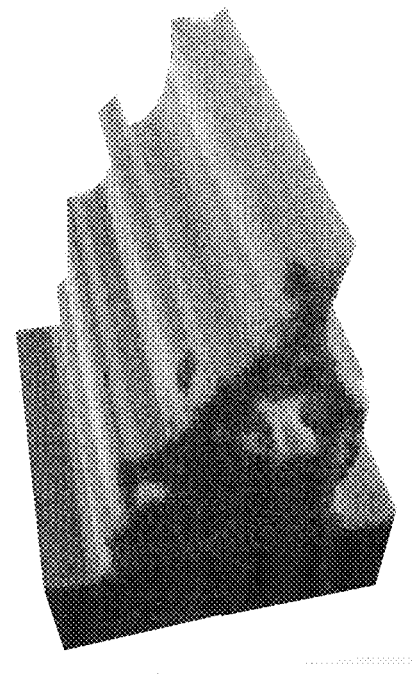
FIG. 5A is a single beam view of a 3D ejectum taken head-on at an angle of 0 degrees showing apparent indeterminate ejecta depth.
Figure 5B:
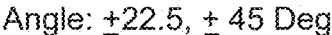
FIG. 5B is a two beam view of the ejectum of FIG. 5A taken at angles of +45 degrees and −45 degrees and showing a 3D image of this ejecta.
Figure 5C:
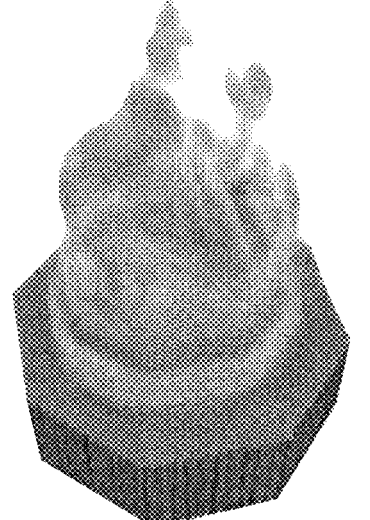
FIG. 5C is a prophetic four beam view of the ejectum of FIG. 5A taken at angles of +/−22.5 degrees and +/−45 degrees and showing a 3D image of this ejecta.

The angular relationships of the plural lasers in FIGS. 1B, 7, 8 and 9 are shown to scale. The shapes of the ejecta in FIGS. 5A, 5B and 5C are shown in scale.

DETAILED DESCRIPTION OF THE INVENTION

Figure 1A:
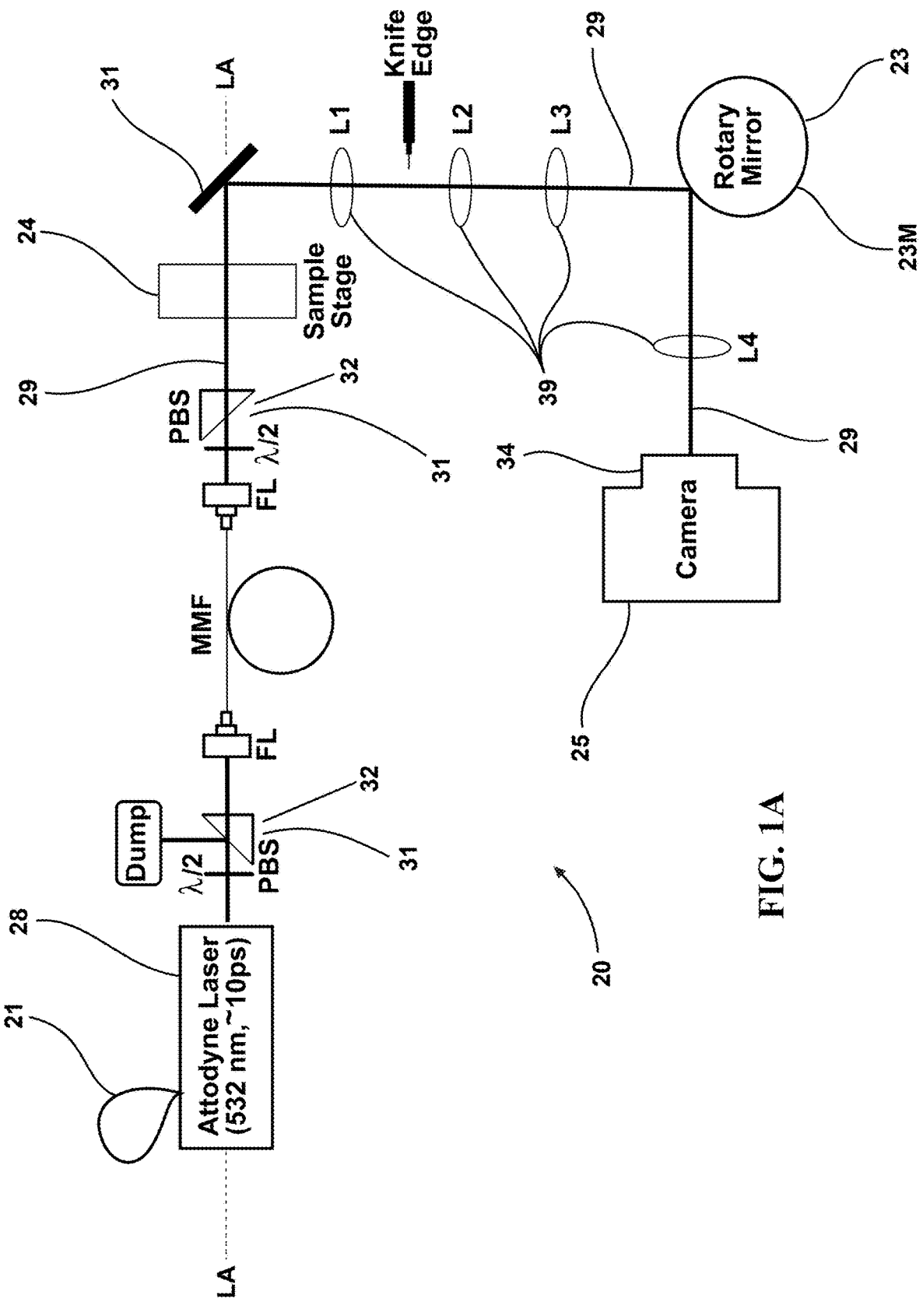
FIG. 1A is a schematic a top plan view of a single beam apparatus according to the present invention and being suitable for two dimensional photography.
Figure 1B:
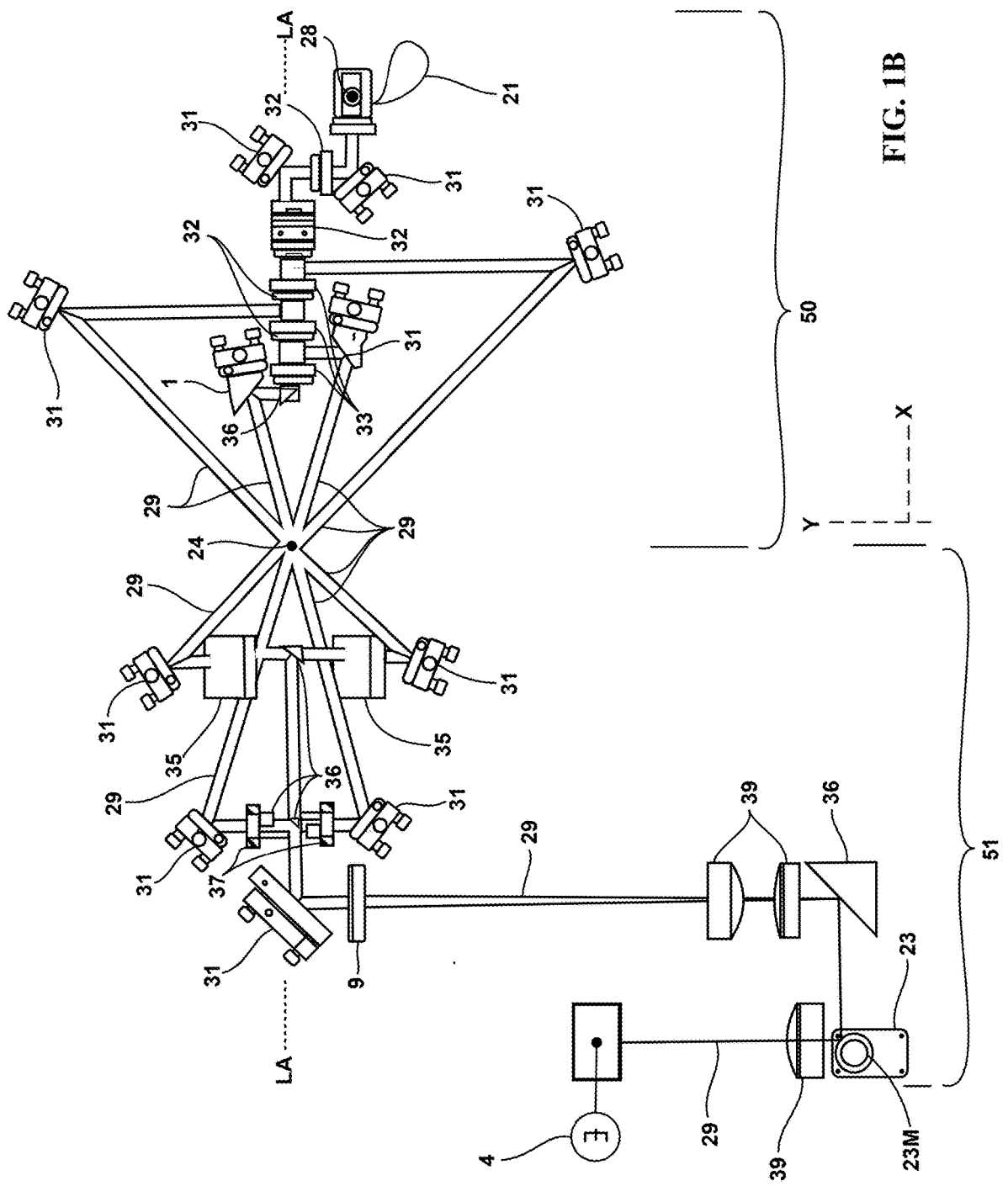
FIG. 1B is a schematic top plan view of a plural beam apparatus according to the present invention having a recombinant section and being suitable for three dimensional photography.
Figures 1C, 2:
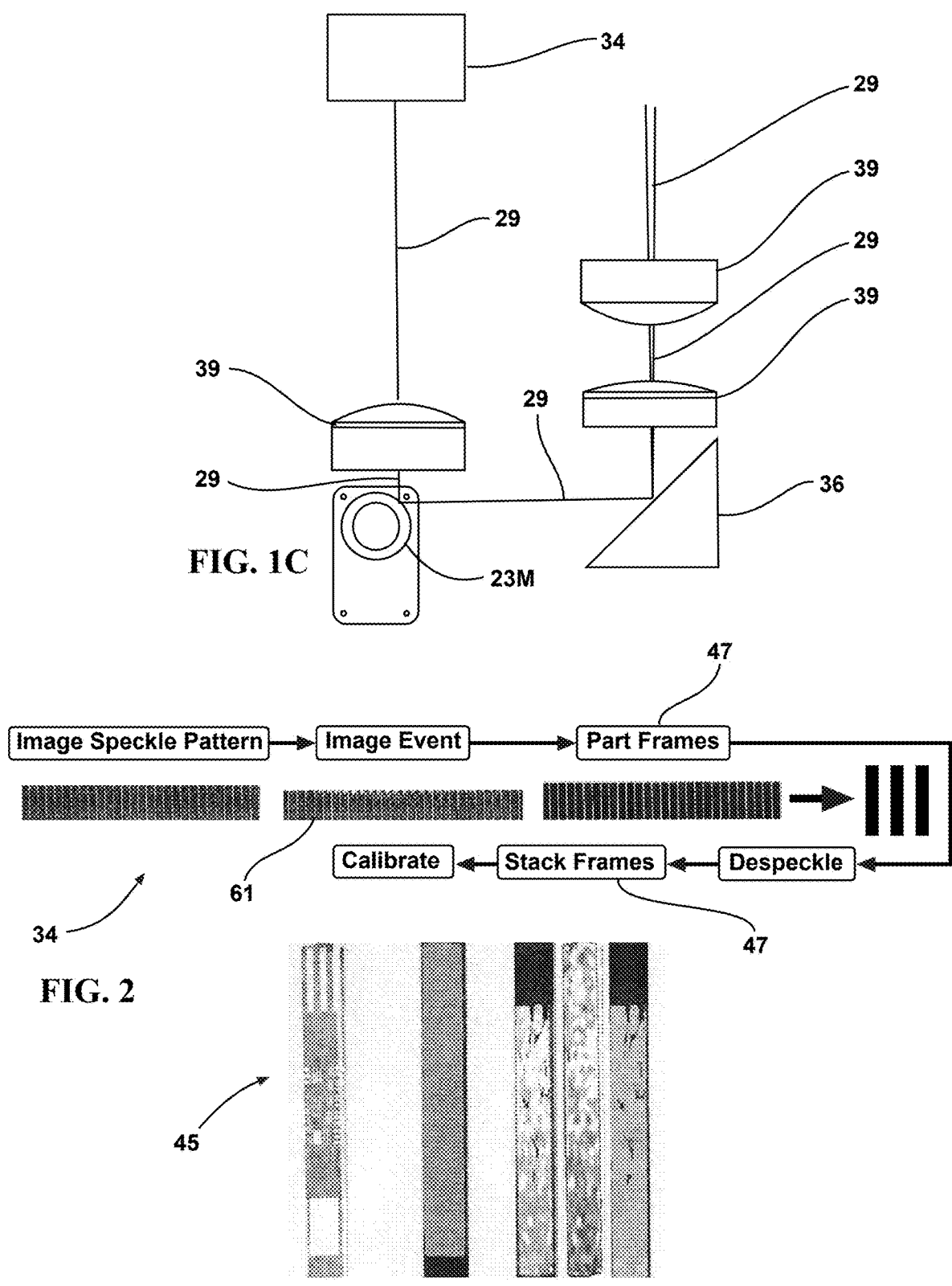

Referring to FIGS. 1A, 1B and 1C, the invention is a strobe photography imaging system 20 capable of achieving frame 47 rates of 1,000,000 frames 47 per second or greater using a scanning device 23, such as a multi-faceted rotating mirror 23M, and femtosecond, picosecond or nanosecond stroboscopic pulsed laser 28. Three dimensional views of the scene can be reconstructed using tomographic reconstruction algorithms and multiple simultaneous projections through the image 45 plane.

In one embodiment the invention comprises an ultrafast strobe photography imaging system 20 having a strobe light source providing sub-nanosecond time resolution per frame 47 and a rotating mirror 23M that deflects subsequent frames 47 to a different location on a single large area image 45 sensor 34. By capturing multiple beam 29 paths through the same field of view, tomographic reconstruction algorithms can be used to estimate the full 3D dynamics that are occurring.

The system 20 of the present invention comprises a pulsed laser 28 capable of emitting a single laser 28 beam 29, one or more kinematics mirrors 31, periscope mounts 37 and/or 90 degree prisms 36 as helpful or necessary to direct the beam 29, or portions thereof, into one or more desired path(s), lenses 39 to produce the desired image 45 magnification and to collimate or focus beams 29 as needed, a stage 24 for displaying the object or event of interest, at least one rotating mirror 23M and an image 45 sensor 34. The apparatus may be conceptually divided into four sections taken in order as: a convergent section 50 comprising the laser 28 and beam 29 splitters 33 for providing a plurality of pulsed laser 28 beams 29, a stage 24 section for holding and position the object/event of interest, a convergent section 50 comprising windows 35 and prisms 36 for recombining the plurality of previously split beams 29 and a camera 25 section comprising at least one rotating mirror 23M, lenses 39 and at least one image 45 sensor 34 for recoding the data of interest.

One of skill will understand that if adequate space is available, fewer prisms 36 and/or mirrors 31 may be needed to conserve footprint. Prisms 36 have the benefit of being relatively compact and highly accurate as to the angle of reflection. Mirrors 31 have the benefit of being flexible and easily adjusted or reconfigured if it is desired to aim the beam 29 in a slightly different or wholly different direction.

Referring specifically to FIG. 1A and examining the invention in more detail, a single stroboscopic laser 28 may be used to intermittently illuminate the object or event of interest. The laser 28 may be passed through a polarizing beam 29 splitter 33 in order to control illumination intensity. Optionally, multimode fiber optics may be coupled with the laser 28 for collimation in order to produce a desired light profile, including a flat top profile. Optional one or more lenses 39 may be used for magnification and/or to create an intermediate focal or knife edge for Schlieren photography of flow characteristics.

The beam 29 is then sent to a scanning device 23, which scans in time across the sensor 34 to perform a time to space conversion. The scanning device 23 deflects each strobe image 45 to a unique location on the image 45 sensor 34 based on the time the frame 47 arrived at the scanning device 23. The scanning device 23 should provide sufficiently high angular scan rates such that strobe images 45 do not overlap on the detector. Suitable scanning devices 23 include a piezo mirror, a galvo mirror and preferably a rotating mirror 23M.

The laser 28 beams 29 from the rotating mirror 23M are sent to a sufficiently high pixel count image 45 sensor 34, preferably a sensor 34 in a camera 25. Preferably only a single sensor 34 is used in order to reduce errors, such as lost frames 47 which could occur between plural sensors 34. The sensor 34 has a minimum size of 256×2048 pixels for 2D imaging and 2048×2048 pixels for 3D imaging, preferably 100 E4 pixels and more preferably up to a commercially available sensor 34 having 86 megapixels. Generally, the single image 45 sensor 34 should have at least 0.5, 1 or 2 megapixels for 2D imaging and at least 4, 8, 15, 20, 40 or up to 80 megapixels for 2D or 3D imaging. The camera 25 may have 10720×8064 pixels with an 80.48 mm diagonal. An external trigger 21 Falcon4-CHLS 86M FA-S0-86M16 AreaScan Camera 25 with a 10720×8064 resolution sensor 34 having 86446080 pixels and 62 dB S/N ratio available from Teledyne DALSA of Waterloo, Canada has been found suitable.

A single trigger 21 of the camera 25 or other recording device captures all frames 47 at once with each frame 47 representing a different point in time. This arrangement is believed to overcome the prior art tradeoffs of spatial resolution vs frame 47 rate. The single trigger 21 can be manually initiated or can occur based upon laser 28 burst, so long as only a single trigger 21 is used. Using a single trigger 21 with a single sensor 34, the entire package of frames 47 is captured at the same time, making the resulting image 45 indifferent to sensor 34 size.

Referring to FIG. 2A1, in response to the single trigger 21 and in order to yield a 2D image 45 at least one subframe 46 is imprinted onto the image 45 sensor 34, with each subframe 46 representing an individual image 45. Optionally a plurality of subframes 46 of the image 45 may imprinted onto the image 45 sensor 34 and separated in time by intervals dT, as shown by the single horizontal row. These subframes 46 may be combined to yield a 2D video of the experiment based upon a single laser 28 projection. The single laser 28 projection is a degenerate case of the 3D multi-laser 28 projection discussed herein. Preferably the time intervals dT are equal throughout the process of the invention. The timing dT of the subframes 46 is advantageously based upon and only limited by the repetition rate of the laser 28.

Referring to FIG. 2A2, in response to the single trigger 21, in order to yield a 3D image 45 a plurality of N×N×M subframes 46 of the image 45 are imprinted onto the image 45 sensor 34, with one subframe 46 being imaged by each laser 28 beam 29. As shown by the rows of subframes 46, each laser 28 projection is dedicated to a particular plurality of subframes 46 over time. I.e. if there are, e.g. four laser 28 beam 29 projections each 3D image 45 will have four subframes 46 and so on for each plurality of laser 28 beams 29. The subframes 46 are combined to form a single 3D image 45 as show by the columns. The 3D images 45 are separated in time by intervals dT. Preferably the time intervals dT are equal throughout the process of the invention. The timing/time step dT of the subframes 46 is advantageously based upon and only limited by the repetition rate of the laser 28. The 3D images 45 may be combined in time to provide 3D videography of the object or event being studied.

Referring back to FIG. 1B and FIG. 1C, and examining the invention in more detail, in the convergent section 50 the apparatus uses one or more pulsed laser 28 light sources to transmit a single beam 29 of light emitted directly from the laser 28, referred to herein as the primary beam 29 before any beam 29 splitters 33 are encountered. Flat field illumination is particularly desired for the event or object of interest at the stage 24. Collimated beams 29 are desirable with a diameter based upon the available optics. Subtractive collimators and eyepiece collimators are judged to be feasible. A primary laser 28 beam 29 diameter of 1 cm is within the expected usable range. Larger beam 29 diameters are feasible if scaled according to the laser 28 output and supporting optics.

The high speed photography system 20 of the present invention is advantageously indifferent to the wavelength of the radiant energy of the source laser(s) 28. The radiant energy may be ultraviolet, infra-red or visible light. The light may have a wavelength of 200 to 1100 nm, preferably 400 to 1000 nm and more preferably 500 to 800 nm and a pulse energy of 8E-9 Joules to 1 Joule, and preferably 10E-5 Joules to 1E-3 Joules. The pulses may have a duration of 10E-13 seconds to 1E-6 seconds and preferably 1E-12 seconds to 1E-9 seconds. The laser 28 may be a Nd:YVO4, Nd:YAG, Er:YAG, TiSapphire or diode pumped fiber type laser 28. A 1 MHz, 532 nm, approximately 10 ps pulse train APL-4000 Series model ALP-X picosecond laser 28 available from Attodyne, Inc. of Toronto, ON, Canada and a RX2 Series Picosecond, model RX2-532-35 laser 28 from Photonics Industries, Inc. of Ronkonkoma, NY, USA have been found suitable.

The strobe light source provides sub-nanosecond time resolution per frame 47, as required by the particular experiment, and preferably a rotating mirror 23M deflects subsequent frames 47 to a different location on a single large area image 45 sensor 34. By capturing the multiple beam 29 paths through the same field of view, tomographic reconstruction algorithms can be used to estimate the full 3D dynamics that are occurring.

Optionally multimode fiber optics may be coupled with the laser 28 for collimation in order to produce a desired light profile, including a flat top profile. A 400 micron core, 0.22NA fiber optic has been found suitable. A diffuser, such as a 5 degree diffuser, may be used reduce speckle 34. Optionally, the laser 28 beam 29 may pass through one or more kinematic mirrors 31 to conserve footprint and for convenience.

The primary laser 28 beam 29 from the source laser 28 may pass through a dichroic beam 29 splitter 33, a plate beam 29 splitter 33, a pellicle beam 29 splitter 33 or preferably a cube polarizing beam 29 splitter 33 such as a Wollaston prism 36 beam 29 splitter 33. A PBS251 model polarizing beam 29 splitter 33 available from Thorlabs Inc. of Newton, NJ, USA has been found suitable. One or more of the resultant split beams 29 may pass through a respective rotating half-wave polarizer 32. The polarizer 32 rotates the angle of the linearly polarized light to control the intensity of light transmitted and reflected by each subsequent beam 29 splitter 33 cube. A WPH10E-532 model polarizer 32 available from Thorlabs Inc. of Newton, NJ, USA has been found suitable.

The primary beam 29 entering the beam 29 splitter 33 is split into a plurality of secondary beams 29 by the beam 29 splitter(s). The secondary beams 29 exit the beam 29 splitter 33 in mutually different directions. Advantageously, the present invention is not sensitive to differences in path lengths encountered in normal laboratory operation. In a common laboratory setting, the longest path may be less than 300 mm or even less than 100 mm, leading to a time difference of less than 1 nanosecond. Differences in path lengths up to 100 meters are believed to be reasonably tolerable with the present invention. Such differences result in timing error at the microsecond level and are advantageously at least an order of magnitude greater than typically encountered in ordinary laboratory usage.

The primary beam 29 is preferably split into secondary beams 29 which are isomerically and isometrically balanced as to power and angle of incidence relative to the stage 24. This arrangement provides the benefit that the split beams 29 intercept the event or object of interest at angles symmetrically opposite to a longitudinal axis LA. This symmetry provides the benefit of simplifying the algorithm, as discussed below and further advantageously reduces reconstruction error. The plurality of secondary beams 29 are preferably not in different vertical planes when passing through the subject to be photographed.

If desired, two or more pulsed lasers 28 can be used in place of a single laser 28 if the single laser 28 does not have adequate pulse repetition rate or pulse energy, different angles are required, different wavelengths are desired, etc. For example, if a 1 Mhz pulse rate is needed, two 500 KHz lasers 28 may be used with the pulses interleaved to provide the desired pulse frequency.

If a plurality of secondary split beams 29 is used, preferably the split beams 29 occur in pairs, so that two beams 29 in a single pair of beams 29 have incident angles at the stage 24 which are symmetrically opposite about the longitudinal axis LA. Thus an embodiment may have a first pair of secondary split beams 29 at first symmetrically opposite angles relative to a longitudinal axis LA, a second pair of secondary split beams 29 at second symmetrically opposite angles relative to the same longitudinal axis LA, a third pair of secondary split beams 29 at third symmetrically opposite angles relative to the same longitudinal axis LA, etc., wherein the first, second and third angles are mutually different. If desired, the stage 24 may be rotated about an axis perpendicular to the split beams 29 to provide different orientations of the subject to be photographed.

A suitable first incident angle is +/−45 degrees if a single pair of split beams 29 is used, yielding a 90 degree included angle between the first pair of split beams 29. If a second pair of split beams 29 is used the second pair of split beams 29 may have a second incident angle of +/−22.5 degrees, yielding a 45 degree included angle between the second pair of split beams 29. If a third pair of is used the split beams 29 is used, the third pair of split beams 29 may have a third incident angle of +/−67.5 degrees, yielding a 135 degree included angle between the third pair of split beams 29. If a fourth pair of is used the split beams 29 is used, the fourth pair of split beams 29 may have a fourth incident angle of +/−11.25 degrees, yielding a 22.5 degree included angle between the fourth pair of split beams 29. All angles of incidence are taken relative to the longitudinal axis LA. Two beams 29 are considered to be a be pair if the two beams 29 have a substantially identical angle of incidence relative to the longitudinal axis LA and lie in a common XY plane.

The secondary beams 29 cannot be diametrically opposed, or the resulting data cannot be separated during post sampling. Therefore two beams 29 at 180 degrees out, four beams 29 at 90 degrees out, eight beams 29 at 45 degrees out, etc. are believed to be infeasible and are not included herein as laser 28 beams 29 convergently aimed or convergently directed towards the stage 24 or towards objects or events disposed on the stage 24.

One of skill will recognize that split secondary beams 29 may or may not be used in pairs. Two laser 28 projections may not intercept the stage 24 at opposed 180 degrees angles, as the resulting frames 47 may not be properly deconstructed. Any integer number of secondary beams 29 may be used, ranging from 2 beams 29, to 3, 4, 5, 6, 7, 8, 9, 10 or any reasonable integer number of split beams 29, limited only by the complexity of the optical design. For example a system 20 having 3 beams 29 at 120 degrees out is believed to be very suitable. It is believed that the benefits of additional beams 29 become incrementally smaller as more than 4 beams 29 are used when photographing generally symmetrical objects. It is believed that when photographing amorphous objects or events using more than 4 beams 29 yields non-negligible benefits.

If the secondary beams 29 are used in pairs, the pairs may be disposed in spaced apart XY planes or are preferably disposed in a common XY plane. Disposing two pairs of secondary beams 29 in a common plane overcomes the disadvantages associated with pair being in spaced apart XY planes, e.g. two image 45 projections and poor fidelity reconstruction, even though scale is preserved.

Examining the stage 24 section in more detail, the stage 24 is disposed at a common point where the split secondary beams 29 have a confluence. The confluence may have a width, within the plane of the secondary beams 29, ranging from 1 mm to 100 mm in ordinary usage, although scaling to larger widths is feasible and contemplated, as limited only by the size of the available optics. The stage 24 may be a steady platform parallel to the plane of the secondary beams 29 and having an elevation adaptable to dispose the object or event if interest to be intercepted by the plurality of split beams 29.

Typical and nonlimiting objects of interest for use with the present invention include, but are not limited to, static objects such as ejecta 65, ablated metal surfaces, synthetic skin, etc. Typical and nonlimiting dynamic events of interest for use with the present invention include, but are not limited to, explosions, conflagrations, smoke, high speed flow, Schlieren contrast events, etc. Except as specifically may be claimed below, the object or event of interest forms no part of the claimed invention. Of particular interest for pulsed laser 28 ablation is the capability to provide an estimation of mass ejected for a given pulse energy.

Examining the recombinant section 51 of the optical system 20 in more detail, the recombinant section 51 serves the purpose of vertically stacking the individual beams 29 and ensuring they propagate along the same x,y trajectory. After the secondary beams 29 pass through the object or event of interest of interest, the secondary beams 29 continue in an expanding footprint until kinematic mirrors 31, 90 degree prisms 36 or the like are encountered, optionally redirecting the beams 29 through windows 35 which shift the vertical plane along which the light propagates to recombine the secondary beams 29, particularly beams 29 of a single pair, into a respective recombined, or tertiary, beam 29. Each recombined beam 29 of each former pair is then recombined with corresponding recombined beams 29 of other pairs until a single, or quaternary, resultant beam 29 occurs. One of skill will recognize that if odd numbers of beams 29 are used or if secondary beams 29 are not paired, then recombination may occur in other sequences.

Examining the camera 25 section in more detail, the single final, quaternary beam 29 may be directed through a set of plural lenes in order to attain the desired magnification. A lens 39 having a focal length of 200 mm-600 mm, preferably 300 mm-500 mm, is judged to be suitable. The single final, quaternary beam 29 may be diverted through a 90 degree prism 36 for convenience and to conserve footprint.

The final, quaternary beam 29 is directed to a discretizing apparatus, such as a rotating mirror 23M, to deflect pulses of light in space based on the time of arrival of the final, quaternary beam 29. The rotating mirror 23M preferably has a spin rate of at least 5000, rpm and from 8 to 128 facets, preferably at least 16 facets. A 16 facet GECKO high speed scanner rotating mirror 23M available from Precision Laser Scanning LLC of Scottsdale, AZ with a spin rate of 45000 rpm has been found suitable. As used herein the terms rotating mirror 23M and spinning mirror 23M are used interchangeably.

The discretized final, quaternary beam 29 may then be passed through another lens 39 to focus the images 45 onto the camera 25, and particularly the image 45 sensor 34 thereof. All of the lenses 39 described herein are positive convex and are achromatic lenses 39 to reduce spherical and chromatic aberrations.

Then, the discretized final, quaternary beam 29 is imaged to an image 45 sensor 34. The image 45 sensor 34 may be part of a camera 25. The image 45 sensor 34 should have a pixel count of at least 4K. A 7920×6004 pixel, 35 mm diagonal, VC-50MC-M18 CMOS camera 25 available from VIEWORKS of the Republic of Korea has been found suitable.

The apparatus of the invention may be assembled and used on an optical table using mechanical mounts and dovetail rails for easy repositioning of lenses 39 as needed to adjust for differences in angular separation that may occur when switching frame 47 rates. Laser light is delivered to the sample plane via a large core multimode optical fiber or by directing the laser 28 in free space in place of the large core multimode optical fiber. The image 45 plane is relay imaged to the rotating mirror 23M and then relay imaged again to the large area CCD camera 25.

In use, the laser 28 strobe light pulses illuminate a dynamic scene, and are then relay imaged to a multi-faceted rotating mirror 23M. The laser 28 pulse can be split into multiple beam 29 paths using polarization or beam 29 splitter 33 optics, and then used to illuminate an image 45 plane from different incident angles. Each image 45 path is then relay imaged to a single facet on a rotating mirror 23M rotating at some speed controlled by its electronics. The rotating mirror 23M and strobe source 28 are synced such that each successive strobe pulse from the light source is relay imaged to a different location on a large area charge coupled device (CCD) or complementary metal oxide semiconductor (CMOS) sensor 34. Each full frame 47 image 45 read-out from the CCD or CMOS sensor 34 then contains multiple rows of sub-frames corresponding to a single strobe illumination that captures the event at a different point in time.

Image 45 processing techniques can then be used to segment each sub-frame, and a video can be rendered by stacking these sub-frames into a data cube. A 3D reconstruction can be performed at each time point where multiple views or projections were captured.

The effective frame 47 rate of the camera 25 is controlled by the repetition rate of the strobe laser 28 source, where the maximum frame 47 rate is limited by the physical distance between the image 45 sensor 34 and rotating mirror 23M such that no overlap exists between sub-frames. The exposure time per frame 47 is controlled by the strobe light pulse duration. The number of frames 47 per sequence is limited by the size of the image 45 sensor 34 used. Proof of concept experiments have been conducted using a picosecond laser 28 running at 1 MHz, but faster repetition rate laser 28 sources are believed to be feasible. The present invention provides the benefit of a variable frame 47 rate with a frame 47 rate ranging from 20 KHz to 20 MHz and preferably 100 kHz to 4 MHz being judged desirable. The present invention provides for advantageously variable frame 47 rates, and furthermore which frame 47 rate may be varied during the course of a single experiment. frame 47 rates of at least 20 E3 FPS, 100 E3 FPS, 2 E5 FPS, 5 E5 FPS, 1 E6 FPS, 2 E6 FPS, 5 E6 FPS, 10 E6 FPS, 20 E6 FPS, 50 E6 FPS, 100 E6 FPS, 200 E6 FPS, 500 E6 FPS, 1 E7 FPS, 1.5 E7 FPS and as fast as 4 E6 FPS or even 2 E7 FPS.

Referring to FIG. 2, image 45 processing follows a three step process: 1) any speckle 34 pattern is imaged and flattened as necessary; 2) the images 45 are segmented using edge detection algorithms and 3) the individual subframes 46 are aligned and a still photograph or video is generated from the stack. Calibration of pixel size/pixel resolution may be accomplished using a USAF 1951 resolution target available from Thorlabs Inc. of Newtown, NJ USA under part number R313S2P.

The speckle 34 pattern is typically uniform in every subframe 46 of an image 45 sequence. The frame 47 size is maintained as generally uniform, preferably within +/−2 pixels frame 47 to frame 47. An inverse speckle 34 mask is used to correct shading. Alignment occurs through minimizing the standard deviation of 1/{frame/speckle 34}. For each laser 28 beam 29 one of skill knows the number of frames 47, the frame 47 rate and the number of pixels per frame 47.

Referring to FIG. 2B1, the image 45 acquisition 200 according to the invention may begin with a single trigger 21 event or a single pre-trigger 21 event 201A, at which point the camera 25 beings the sensor 34 exposure 201B in response to a pulsed laser 28 strobe 201C. Each occurrence of the single trigger 21 saves one and only one image 45. The next step 202 separates the pulsed laser 28 into a plurality of separate beams 29. The beams 29 are preferably in the same XY plane, to simplify the reconstruction. Conversely, mutually orthogonal panes may be used in a 3D scene for image 45 acquisition, as described below. The pulsed laser 28 strobe begins to pulse 201D.

At the start 203A of the event of interest the trajectories of the separated laser 28 beams 29 pass through or are reflected by the event 203B at different angles until the end of the event 203C or sufficient data have been collected. The next step 204 recombines the split laser 28 beams 29 into the same XY trajectory but at different Z elevations, it being understood the X, Y and Z axes are mutually orthogonal and the XY, YZ and XZ planes are likewise mutually orthogonal. In the next step 205 the recombined pulsed laser 28 beam 29 is then focused onto a rotating mirror 23M. In the next step 206 the rotating mirror 23M separates each pulse of the laser 28 beam 29 onto a different trajectory based upon the time of arrival and incident angle of the rotating mirror 23M. In the next step 207 the split pulses from the rotating mirror 23M are sent to the camera 25 and particularly to the image 45 sensor 34 thereof. In the next step 208 the split pulses are aligned and stacked, typically vertically stacked, into dependent frames 47. At any point in the process the image 45 may be calibrated, so that the dimensions of artifacts in the photograph are known.

Referring to FIG. 2B2, to perform the frame 47 alignment 250, in one step 251 the raw images 45 are digitized into a binary array of ones and zeros (1's and 0's). In the next step 252 edge detection occurs by locating columns for which zeros and ones are interchanged for each row of pixels. In the next step 253 frame 47 separation occurs by averaging the columns found in each row. In the next step 254 the original image 45 is partitioned along binary transitions so that each partition is a frame 47: #F1, #F2, #F3, . . . . Fn. In the next step 255 the inverse translation is applied to each frame 47 number #F1, #F2, #F3, . . . #Fn to minimize the absolute value of the difference between that frame 47 and frame 47 #F1 according to a standard grey scale where 0 is pure black and 255 is pure white. In the next step 256 each frame 47 is divided by the absolute value of the reciprocal of the ratio of #F1 to the maximum frame 47 value in that image 45 for #F1.

In the next step 257 if the raw image 45 has multiple rows indicating additional angles of laser 28 beams 29 are under consideration, a Yes/No decision occurs. If Yes, the edge detection step 252 is repeated. If No, the next step 258 is to truncate the number of frames 47 to match the angles of each beam 29 of the plurality of beams 29.

In proof-of-concept work, to the invention successfully captured ablation dynamics from a single nanosecond laser 28 pulse incident on a piece of synthetic tissue using three illumination paths with a strobe rate of 1 MHz enabling the complete capture of material ejected from this synthetic tissue. Furthermore, the present invention provides a system 20 with the capability to record a video of more than 20 frames 47 with a single photo from a single image 45 sensor 34. By a single image 45 sensor 34, it is meant that there is one and only one image 45 sensor 34 used in the system 20 according to the present. Using one and only one sensor 34 advantageously prevents loss of frames 47 which could occur due to gaps between plural sensors 34.

Furthermore, the present invention unexpectedly decouples frame 47 rate from image 45 sensor 34 performance. The present invention provides efficient throughput taking a plurality of videos, such as up to four videos, in a single photograph by using the reconvergence stage 24.

The present invention provides the further benefit of reducing mechanical timing error, limiting such error to the wow and flutter of the rotating mirror 23M. Strobe sources, such as the pulsed laser 28 of the present invention, are more accurate than the mechanical systems of the prior art. The video algorithm of the present invention is indifferent to the distance between frames 47—which varies with mechanical error. The present invention further provides the flexibility to continually vary the number of frames 47 and demagnification/image 45 resolution, between 10 frames 47 and 150 frames 47, preferably between 20 and 100 frames 47 and 2× to 8× magnification. By way of nonlimiting example, the present invention is capable of 20 frames 47 at 2× and 20 to 40 frames 47 at 3×. The present invention further provides the flexibility to capture fractions of frames 47.

Figure 2C:
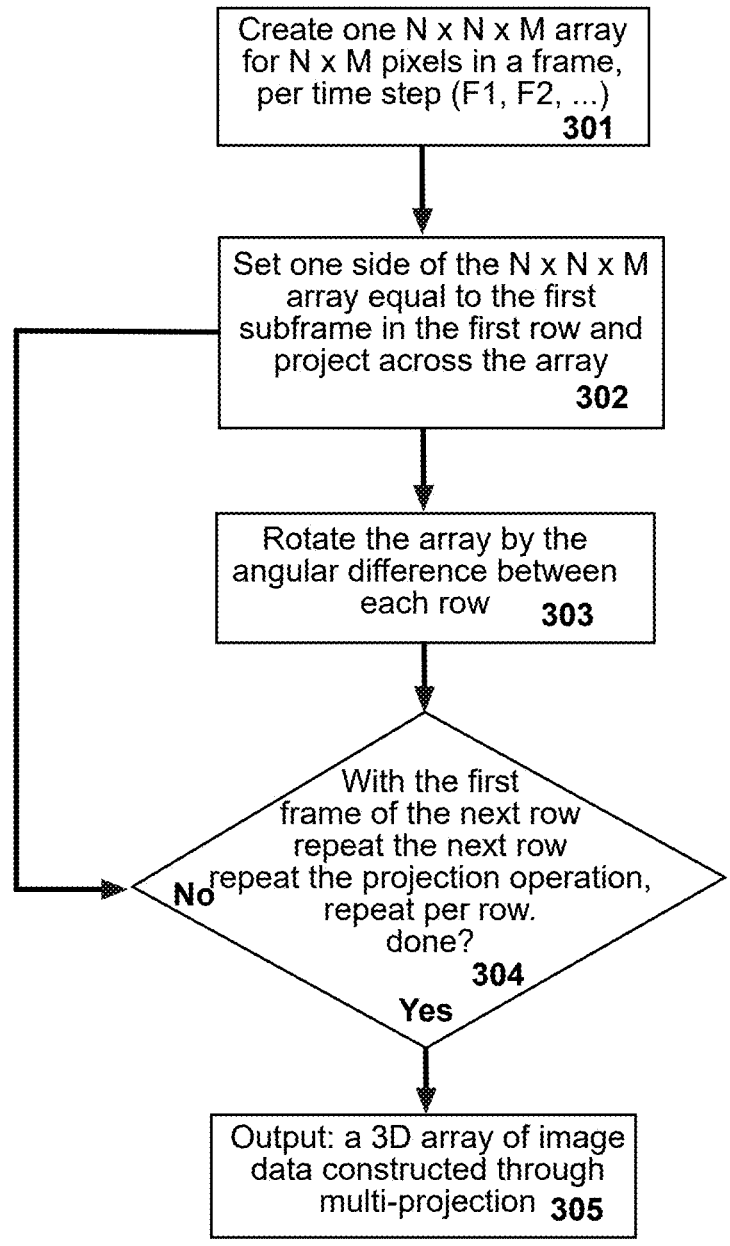
FIG. 2C is a flow chart of an algorithm for creating a three dimensional image using the present invention.

Referring to FIG. 2C, the present invention further provides a system 20 with the capability to create three dimensional (3D) photographs and videos in a single photo. To create 300 a static 3D image 45, an N×M array 48 of pixels is taken from one frame 47 in the two dimensional array 48 developed by the steps in the camera 25 operation and frame 47 alignment processes 200, 250. An N×N×M array 48 is created 301 by rotating the frame 47 width by the angular difference between beams 29 in the XY plane. In the next step 302 one side of the N×N×M array 48 is set equal to the first row of the array 48 and projected across the array 48. In the next step 303 the N×N×M array 48 is rotated by the angular difference between each row. In the next step 304 a Yes/No decision occurs. If Yes, the array 48 projection step 302 is repeated. If No, the next step 305 is to output a 3D array 48 of the image 45 data which was projected through the multi-point projection and the process 300 is terminated.

If one desires to have dynamic 3D video images 45, a 4D array 48 is formed according to N×N×M×dT where dT is the time interval set by the laser 28 repetition rate. For a static 3D image 45, the subframes 46 from the same time point are used to generate an N×N×M array 48. For dynamic 3D videos, each static frame 47 becomes a frame 47 in the video where dT is controlled by the laser 28 repetition rate.

Figure 3:
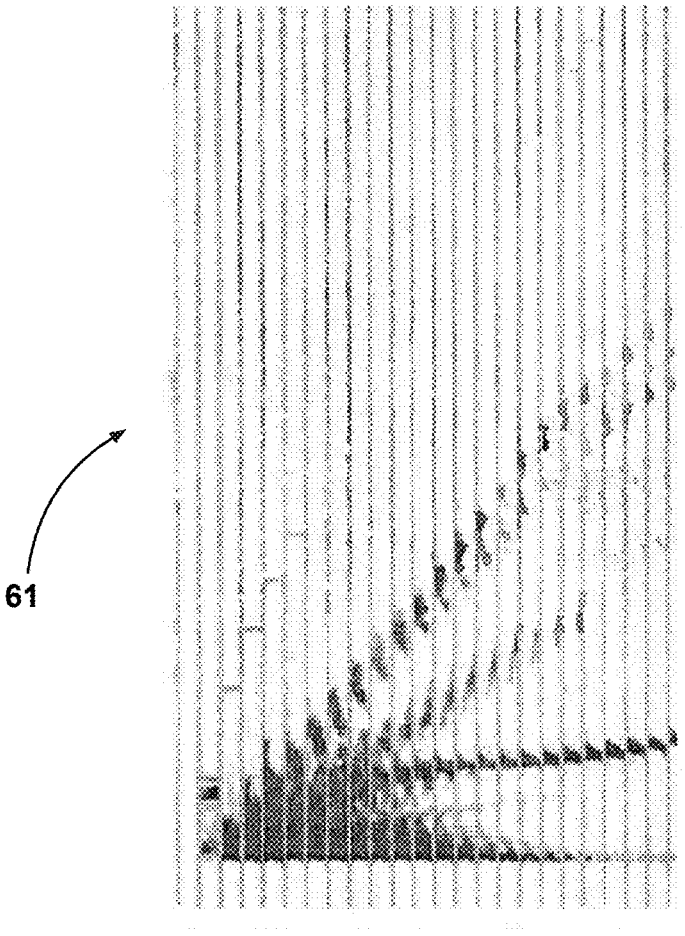
FIG. 3 is a photograph of a shockwave in air.

Referring to FIG. 3, an exemplary shockwave 61 is photographed at a 1 MHz laser 28 pulse repetition rate dT. Each frame 47 of the shockwave 61 is read in series. Using the present invention, ejected mass estimations are advantageously accomplished using a single projection. The camera 25 image 45 is processed using custom written code to both partition sub-frames and to reduce background artifacts caused by the laser 28 speckle 34 from the strobe source. The shockwave 61 parameters of the ejecta 65 may be determined by analyzing pixel displacement 62 per frame 47. The present invention may also be used to measure energy budget.

It is understood that 2D photography according to the present invention can be used to measure displacement 62, velocity 63, and acceleration 64, but not mass. The present invention may be used to measure the volume of ejecta 65 limited in resolution to the size of a voxel. By knowing the rough density of the sample, one of skill can calculate the mass of the ejecta 65 using the simple relationship where density=mass/volume. The size of a voxel is governed by the spatial resolution of each projection and the number of projections through the sample used for reconstruction.

Referring to FIG. 4A, FIG. 4B and FIG. 4C, the displacement 62 of the shockwave 61 is shown in FIG. 4A. Displacement 62 is calculated by tracking the pixel location of the shockwave 61 from frame 47 to frame 47. Distance is computed by tracking the number of pixels the shockwave 61 has traversed and using the size of the pixel which was calculated from a resolution target imaged with the same system 20. Velocity 63, as shown in FIG. 4B may be calculated by dividing the displacement 62 by the time step, dT or as the derivative of the displacement 62 with respect to time. As shown in FIG. 4C, acceleration 64 can be computed as the derivative with respect to time of the velocity 63 shown in FIG. 4B.

With continuing reference to FIG. 4A, FIG. 4B and FIG. 4C, for proof of concept experiments, laser 28 ablation was achieved using a 1064 nm, 4-7 ns, up to 650 mJ pulse from a SURELITE SL-II-10 q-switched Nd:YAG laser 28 available from Continuum Electro-Optics/Amplitude Laser Inc of Bordeaux, France. The ablation pulse was delivered from the bottom of the frame 47 upwards into a piece of synthetic biological tissue. Advantageously, the present invention provides the capability to capture both shadow photography and Schlieren contrast. Swapping between the two methods of contrast can readily be achieved by translating a knife edge into an intermediate focal plane following the sample plane. In order to validate the image 45 system 20 is working as intended, the displacement 62, velocity 63, and acceleration 64 of a shock wave captured by the rotary strobe image 45_r_ were extracted. As can be seen from the velocity 63 plot, the shock wave travels at supersonic speeds for the first few fames but decelerates to match the speed of sound in air with a velocity 63 of approximately 341 m/s. The estimation is limited by the ability to sample the displacement 62 of the shockwave 61 based on pixel size.

Referring to FIG. 5A, FIG. 5B and FIG. 5C, the present invention may be used to determine 3D volume and mass of an ejectum 65 or plural ejecta 65. One parameter of particular interest is estimation of mass ejected for a given pulse energy. To do this, the inventors first attempted to estimate the mass of the ejected material captured in a shadow photography sequence from a single projection or illumination path above the target. Estimations based on a single image 45 sequence alone are quite challenging, as the ejected material will disperse arbitrarily in the 3D space above the sample and a 2D image 45 provides no depth information. An initial projection and estimation for mass is based on a density of ~1.02 g/cm2 for skin, providing an estimate the mass of the ejected martial to be 1.56 mg. This estimation demonstrated the need to add more illumination paths to the camera 25 system 20 in order to provide multiple angles such that more accurate estimations can be made.

More particularly, in FIG. 5A, a single beam 29 coincident the longitudinal axis LA is used for photographing a particular ejectum 65 formed by ablation of synthetic tissue due to a nanosecond laser 28 pulse. The single beam 29 shows the shape of the ejecta 65, but cannot be used to determine overall depth.

In FIG. 5B two beams 29 at +/−45 degrees to the longitudinal axis LA with a 90 degree included angle used. This image 45 shows total depth of the ejecta 65.

In FIG. 5C two beams 29 at +/−22.5 degrees to the longitudinal axis LA with a 45 degree included angle and two beams 29 at +/−45 degrees to the longitudinal axis LA with a 90 degree included angle are used. This image 45 illustrates improved depth and curvature over the image 45 of FIG. 5B.

By way of nonlimiting example, one could estimate the mass of the ejected material captured in a shadow photography sequence from a single projection or illumination path above the target. Prior art estimations based on a single image 45 sequence are challenging, as the ejecta will arbitrarily disperse in the 3D space above the sample. An initial estimation for mass is shown in FIGS. 5A, 5B and 5C is based on a density of approximately 1.02 g/cm2 for skin, and using an image 45 sensor 34 6004 pixels tall and an individual sub-frame is only 300-400 pixel in height for the current configuration. The mass of the ejected martial is estimated to be 1.56 mg.

The addition of more projection angles through the sample plane results in more accurate estimations of mass ejected, but at the tradeoff of requiring more complex optical systems to acquire all frames 47 in a single shot. Thus, the initial laser 28 pulse exiting the optical fiber is split into three different beam 29 paths using a fixed ratio beam 29 splitter 33 followed by the combination of a half-wave plates and polarizing beam 29 splitter 33. A series of mirror 31 pairs are used to direct the beam 29 through the sample field of view at angles of 0°, +45° and −45°. Another set of mirrors 31 was used to direct the pulsed laser 28 beams 29 to a knife edge mirrored prism 36. The parallel beam 29 paths from the prism 36 were reflected from the rotating mirror 23M and onto different sections of the CMOS camera 25, such that each row of sub-frames composes a single angle of projection to the sample space. Image 45 reconstruction follows the same process as described herein.

Using the present invention, all sub-frame pairs are generated from the same strobe source, so that timing is maintained with sub-nanosecond precision between the arms of the imager, even if sub-frames are shifted in laterally along the CMOS-ef, as would be the case if there are small differences in arm length. Furthermore, time zero can easily be captured via the plasma flash from an ablation event, enabling reconstruction of the two arms properly synced in time for frame 47 pairs. Reconstruction can be performed independently of imaging an ablation event, as the timing will remain stable during system 20 operation so long as the rotating mirror 23M remains powered and rotating at relatively constant RPM.

Figure 6:
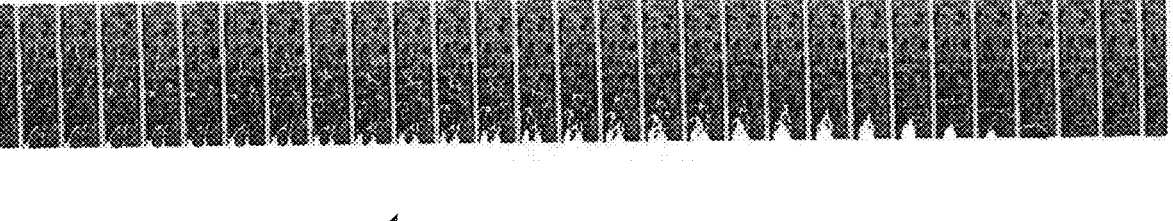
FIG. 6 is a stroboscopic series of photographs of laser ablation of a synthetic tissue.
Figure 6:

Referring to FIG. 6, in one example, a 1 MHz, 532 nm, ~10 ps pulse train from an Attodyne ALP-X laser 28 was used as the strobe illumination source. The output of the laser 28 was coupled into a multi-mode fiber (400 µm core, 0.22 NA available from Thorlabs Inc. of Newtown, NJ USA) that was used to produce a flat top profile on the output side. A 5 degree diffuser was used to minimize speckle 34 artifacts in the illumination light. Following collimation, the beam 29 was passed over the top of a sample stage 24 that was used to hold synthetic tissue samples (Syndaver, USA), and cast 6061 aluminum stock. In this geometry, shadow photography is the default method of contrast. The shadow image 45 is then relayed to a 16 faceted rotating mirror 23M (Precision Laser Scanning Gecko High Speed, USA). The total angular sweep for a 35 mm diagonal camera 25 using a 16 facet rotating mirror 23M is 12 degrees. A larger angle may be available is one uses a larger sensor 34. The image 45 is then imaged to a VC-50MC-M18 CMOS camera 25 (7920×6004 pixels, 36.43 mm×27.62 mm, 45.72 mm diagonal, 35 mm optical format) available from VIEWORKS of Republic of Korea.

This example amply demonstrates the ability of the invention to capture the ablation dynamics from a single nanosecond laser 28 pulse incident on a piece of synthetic tissue using three illumination paths with a strobe rate of 1 MHz enabling the complete capture of material ejected from this synthetic tissue.

Each read out image 45 from the CMOS camera 25 contains a large number of subframes 46 which each capture a single strobe image 45. The image 45 size in terms of pixels, number of images 45, and magnification are all highly modular for this system 20, advantageously enabling tuning based on need. The total number of frames 47 and number of pixels per frame 47 are only limited by the total size of the sensor 34, thus more frames 47 can be acquired for smaller sub-frames.

Advantageously, the camera 25 system 20 of the present invention provides that the speckle 34 pattern from frame 47 to frame 47 in a given sequence did not appear to substantially change for one read out image 45. This advantage allows for easy correction of background speckle 34 provided that a single representative image 45 sequence is collected first.

The present invention can also be used for Schlieren photography. Schlieren photography is a technique by which the flow of fluids with varying densities can be photographed. Schlieren photography is similar to the shadowgraph technique and relies on the bending of light when changes in density of a fluid are encountered. Such a Schlieren system may be used to visualize fluid flow away from the surface of an object. The Schlieren system may also be used to increase contrast and imaging for stress/strain and also for shadow photography.

Using an image 45 sensor 34 that is 6004 pixels tall an individual sub-frame is only 300 pixels-400 pixels in height for a suitable configuration, the sensor 34 has ample additional area which could be used to achieve multiple projection imaging. Similar to the reconstruction steps performed for CT tomography, the addition of more projection angles through the sample plane would result in more accurate estimations of mass ejected, but at the tradeoff of requiring a more complex optical system 20 for acquisition of all frames 47 in a single shot.

Accordingly, the present invention has modified the prior art to provide three projections through the sample space. The initial laser 28 pulse exiting the sample is split into three different beam 29 paths using a fixed ratio beam 29 splitter 33 followed by the combination of a half-wave plates and polarizing beam 29 splitter 33. A series of mirror 31 pairs are used to direct the beam 29 through the sample field of view at different angles (0°, +45° and −45°), and another set of mirrors 23M is used to direct the beams 29 to a knife edge mirrored prism 36. The parallel beam 29 paths from the prism 36 are reflected off the rotating mirror 23M and onto different sections of a CMOS camera 25, such that each row of sub-frames composes a single angle of projection to the sample space. Image 45 reconstruction follows the same process as before. Time zero can easily be captured via the plasma flash from an ablation event, enabling reconstruction of the two arms properly synced in time for frame 47 pairs. By increasing the number of projections from one to three, one of skill can greatly increase the accuracy at which ejected mass is estimated.

Figure 7:
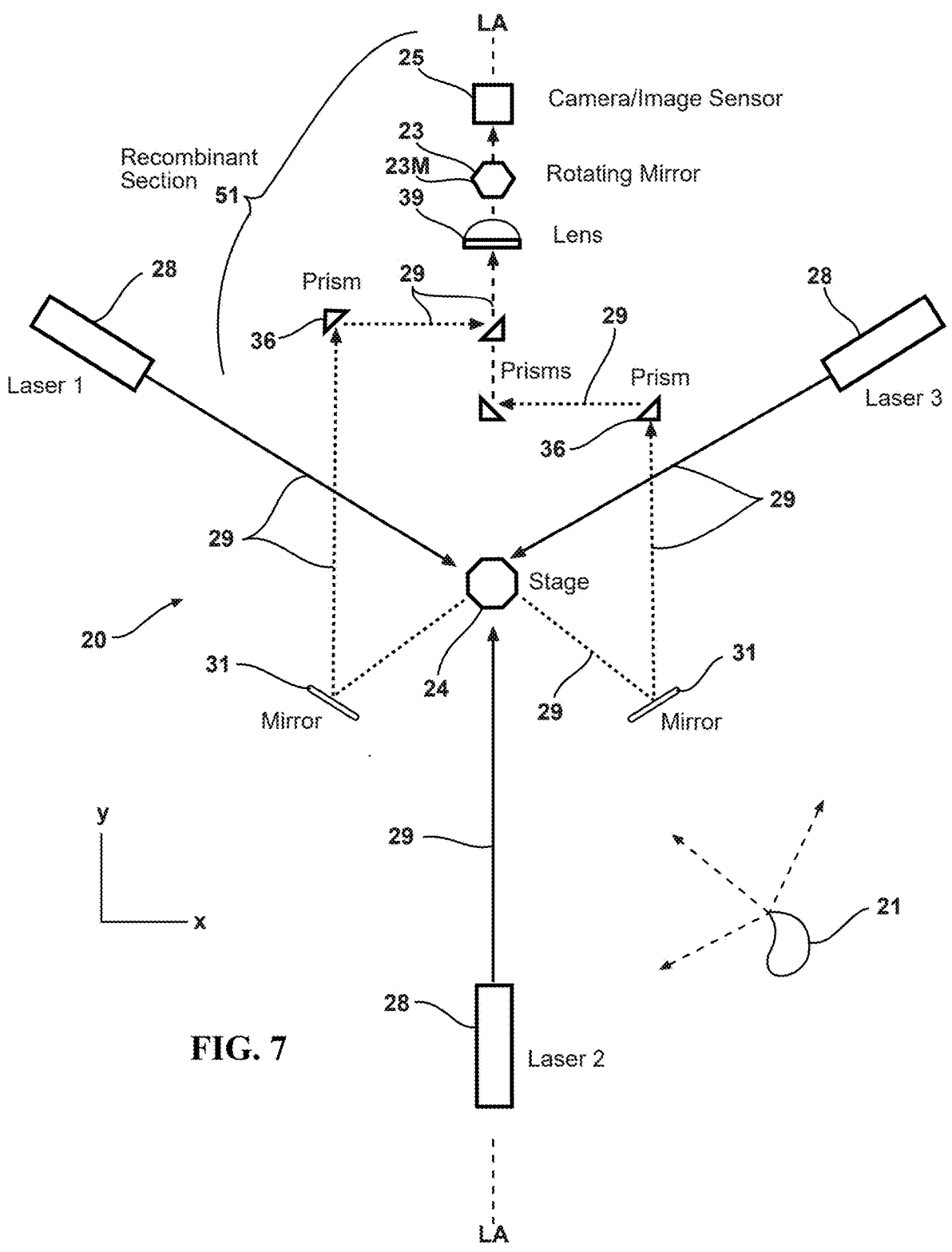
FIG. 7 is a schematic top plan view of an alternative embodiment having embodiment having equally circumferentially spaced plural source lasers.

Referring to FIG. 7, in another embodiment plural pulsed source lasers 28 may be used in place of a single source laser 28 and beam 29 splitter 33. This nonlimiting embodiment has three source lasers 28 circumferentially disposed 120 degrees apart. Laser 28 #1 and laser 28 #3 are represented as being in the same plane, 60 degrees out from the longitudinal axis LA and are considered to be paired lasers. The three lasers 28 may be mutually identical or be different as to energy output, pulse duration and/or wavelength. The beams 29 aimed at the stage 24 are shown in solid lines, whereas the beams 29 which passed through the object or event of interest are shown dashed from the stage 24 to the camera 25 in a beam 29 recombinant section 51 of the system 20.

Figure 8:
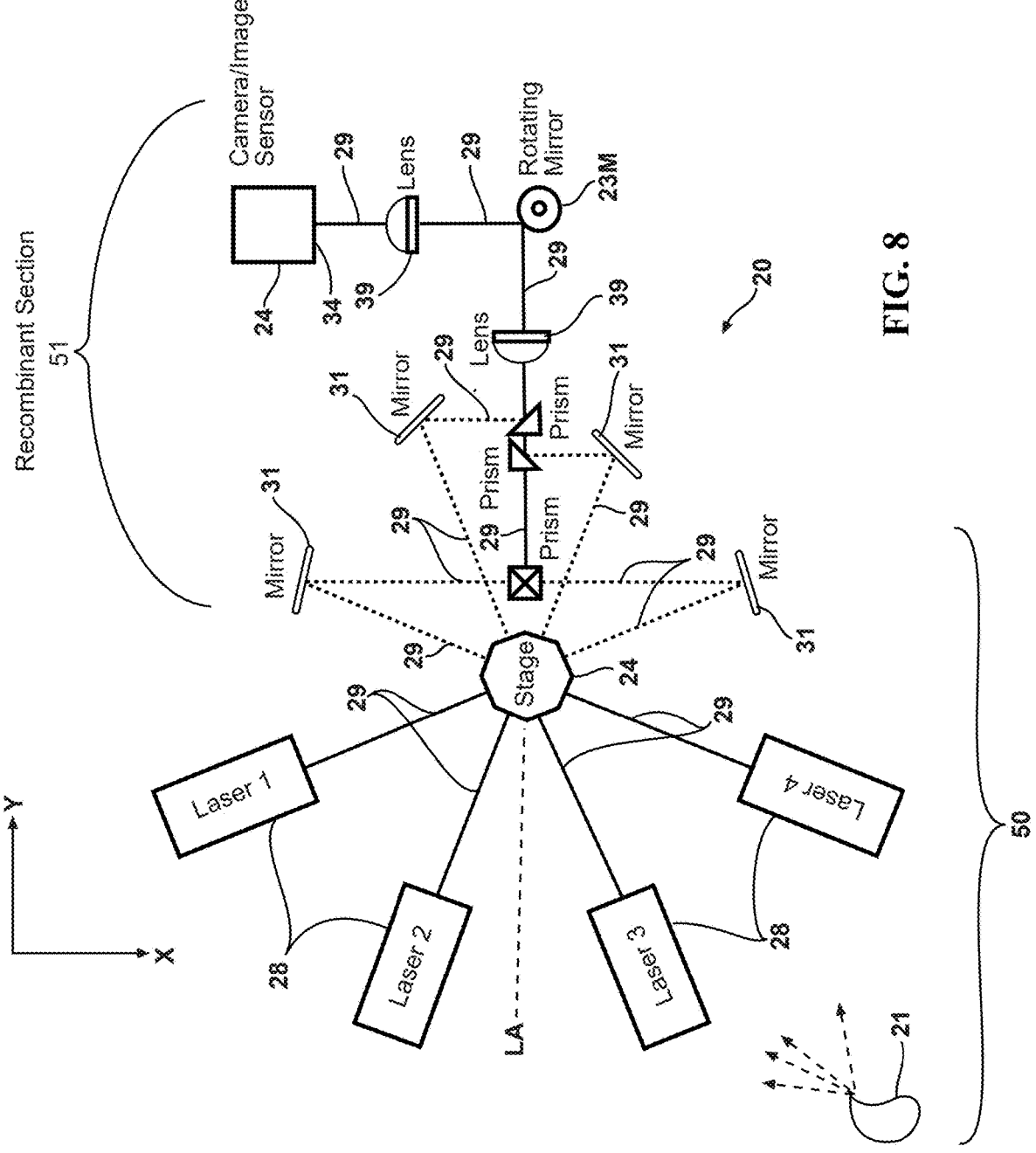
FIG. 8 is a schematic top plan view of an alternative embodiment having embodiment having symmetrically circumferentially spaced plural source lasers with no lasers disposed in the recombinant section.

Referring to FIG. 8, in another embodiment a plurality of four pulsed source lasers 28 may be used in place of a single source laser 28 and beam 29 splitter 33. This nonlimiting embodiment of has four source lasers 28 with laser 28 #1 and laser 28 #4 being disposed 135 degrees out, laser 28 #2 and laser 28 #3 being 45 degrees out and all lasers 28 being in the same plane, symmetric about the longitudinal axis LA. Laser 28 #1 and laser 28 #4 are considered to be paired lasers. Laser 28 #2 and laser 28 #3 are considered to be paired lasers 28. The four lasers 28 may be mutually identical or be different as to energy output, pulse duration and/or wavelength. The beams 29 aimed at the stage 24 are shown in solid lines, whereas the beams 29 which passed through the object or event of interest are shown dashed exiting the stage 24 in a beam 29 recombinant section 51 of the system 20.

Figure 9:
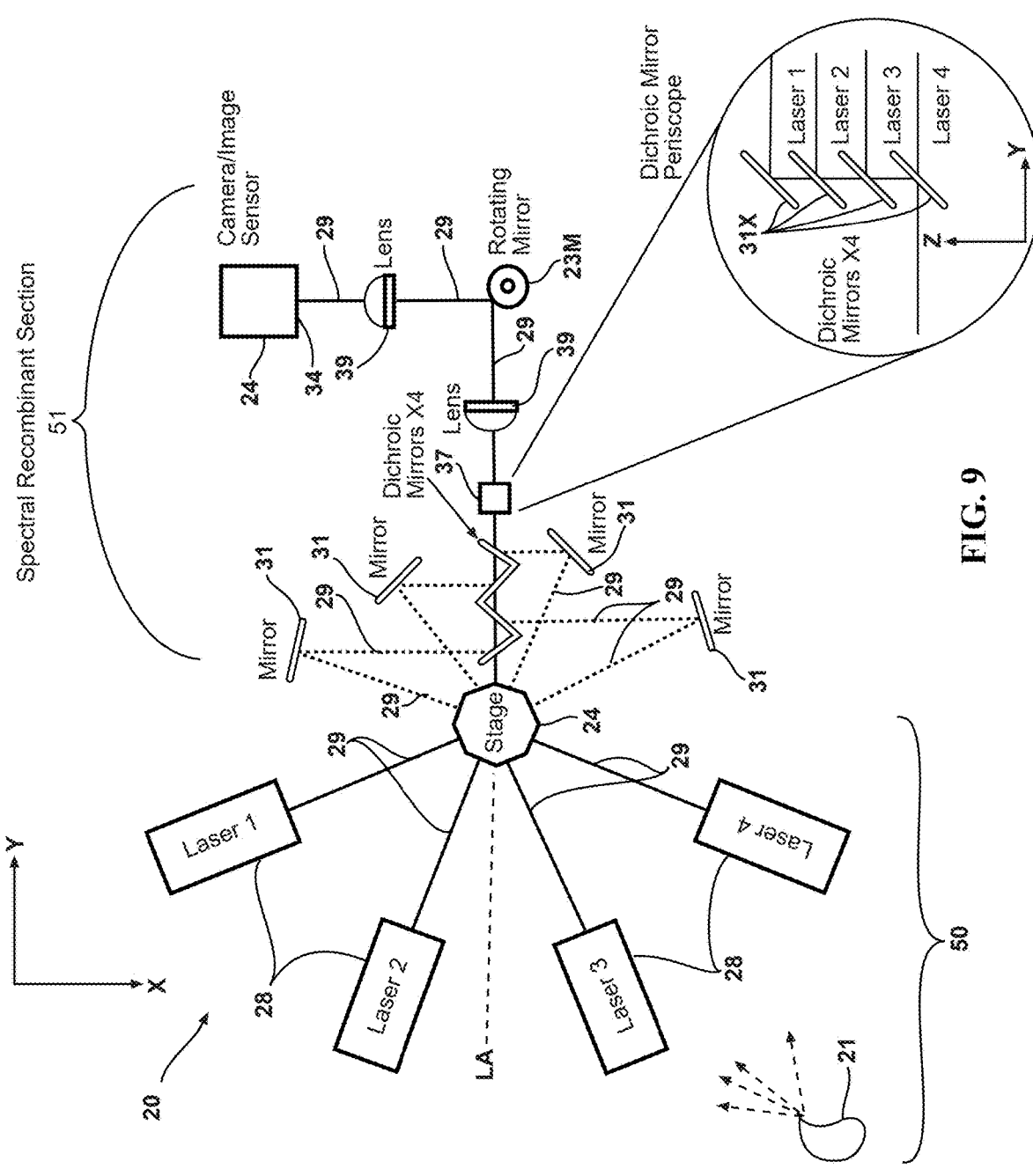
FIG. 9 is a schematic top plan view of an alternative embodiment having plural lasers with spectral separation.

Referring to FIG. 9, Lasers 28 #1, #2, #3, and #4 are shown as described with the FIG. 8. In the recombinant section 51 a dichroic mirror 31X is provided for each laser

28 beam 29 or projection. The dichroic mirrors 31X reflect certain specific wavelengths and transmit other wavelengths therethrough. For this nonlimiting example, four lasers 28 and four respective dichroic mirrors 31X are provided with the dichroic mirrors 31X being vertically stacked in the Z direction perpendicular to the XY plane of the lasers 28. This embodiment provides the benefit that each laser 28 may have a different wavelength, providing for differing illuminations of the sample under consideration.

It is to be understood that the beams 29 aimed at the stage 24 and the beams 29 after the stage 24 may be in the same XY plane or different XY planes based up Z direction angulation of the mirrors 31 and/or prisms 36. It is understood the rotating mirror 23M may rotate about the Z axis which is mutually perpendicular to the X and Y axes or may rotate about an axis skewed relative to the XY plane. This embodiment uses the same reconstruction scheme for frame 47 alignment and/or 3D imaging as occurs with the beam 29 splitter 33 embodiment.

If desired, when using plural pulsed source lasers 28, the laser 28 beams 29 may have mutually identical wavelengths for simplicity. Alternatively, one or more of the laser 28 beams 29 may have mutually different wavelengths in order to illuminate different portions of the object or event, or to enable spectral separation of the different beams 29.

This second embodiment entails more complexity as to timing and alignment than the single source laser 28 beam 29 and beam 29 splitter 33 embodiment, but has the benefit of redundancy in case a failure of a single laser 28 should occur. One of skill will recognize that a hybrid system 20 utilizing plural source lasers 28 and beam 29 splitters 33 for some or all of the plural lasers 28 is feasible and within the scope of the claimed invention.

Accordingly, one could use a hybrid embodiment having a plurality of lasers 28 and one or more lasers 28 in conjunction with a beam 29 splitter 33. This hybrid embodiment provides the benefit of redundancy and security that at least the split beams 29 will have common alignment and timing. In another embodiment one could incorporate multiple rotating mirrors 23M and image 45 sensors 34 into one combined system 20 to enable collection of larger pixel frames 47 or more projection angles through the image 45 plane.

A rectangular imaging sensor 34 having a large aspect ratio would be highly suitable for imaging with the camera 25 and system 20 of the present invention and prophetically could further enhance collection capabilities. By way of nonlimiting example such an image 45 sensor 34 could have first dimension of 3000 to 4000 pixels and an orthogonal dimension of 30 E3 to 60 E3 pixels to yield an aspect ratio of at least 10:1, 15:1 or 20:1. A convexly curved image 45 sensor 34 is also believed to be advantageous.

For the system 20 described and claimed herein, the exposure time and frame 47 rates are both adjustable based on laser 28 parameters. The exposure time and frame 47 rate can be tuned based on the desired parameters relevant to a particular application. A single large area CCD/CMOS may be used to capture all sub-frames into a single read out image 45, which greatly simplifies alignment and timing requirements compared to framing cameras 25 having 78 cameras 25 were attempted in the prior art.

The rotating mirror 23M strobe photography system 20 of the present invention has unexpected improvements over previous state of the art. For single projection imaging, the present invention unexpectedly decouples frame 47 rate, number of pixels per frame 47, and number of frames 47 into mutually independent parameters. These parameters are only limited such that the total number of pixels recorded (number of pixels per frame 47 multiplied by the number of frames 47) cannot exceed the total number of pixels available on the image 45 sensor 34.

This system 20 of the present invention is the only known imaging tool capable of recording multiple projections of the same scene with at least or up to 300 pixels by 150 pixels (45 E3 pixels) at frames 47 rates exceeding 1 million FPS. This system 20 enables the use of tomographic reconstruction in order to render a 3D view of a scene with frame 47 rates exceeding 1 million FPS. The number of projections can be controlled based on the imaging application, where increasing the number of projections will result in a more accurate 3D reconstruction. Compared to prior art such as compressed ultrafast photography, the encoding results in a 3D reconstruction that is not fully sampling in either the spatial or temporal domains of the scene being recorded. In contrast, the system 20 described and claimed herein captures the full spatial dynamics for each projection, enabling lossless reconstruction of the 3D dynamics.

The combination of temporal resolution provided by the strobe pulse, tunability in frame 47 rate, and use of a single sensor 34 to record data are believed to be unique to this invention and only limited by laser 28 repetition rate. A larger number of projections increases the accuracy of tomographic reconstruction, at the cost of a more complex system 20.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa. While particular embodiments of the present invention have been illustrated and described, it would be obvious to those skilled in the art that various other changes and modifications can be made without departing from the spirit and scope of the invention. It is therefore intended the appended claims cover all such changes and modifications that are within the scope of this invention.

What is claimed is:

1. A method of determining kinematic properties of a three dimensional (3D) ejectum resulting from a dynamic event, the method comprising the steps of:

providing a three dimensional photography system comprising a first plurality of pulsed laser beams, a single trigger therefor, a stage for holding a dynamic event to be observed and whereat the first plurality of pulsed laser beams converge, a recombinant section for combining the first plurality of pulsed laser beams into a single pulsed laser beam after the stage, and a single image sensor for receiving the first plurality of pulsed laser beams as a like plurality of subframes for a second plurality of time steps, wherein each subframe corresponds to a respective to individual pulsed laser beam in each respective time step;

combining the first plurality subframes for each time step into a respective frame whereby a second plurality of frames is available;

creating a second plurality of N×N×M arrays of N×M pixels for each respective frame;

combining the second plurality of N×N×M arrays for each time step to create a three dimensional N×N×M×dT video of a dynamic event observed on the stage; and kinematically analyzing the three dimensional N×N×M×dT to video of the dynamic event determine dynamic characteristics of at least one 3D ejectum resulting from the dynamic event.

2. A method according to claim 1 wherein a displacement of a first 3D ejectum is determined by tracking a pixel location thereof from a first frame to one or more later frames as determined by the time steps.

3. A method according to claim 2 wherein a velocity of the first 3D ejectum is determined by dividing the displacement thereof by the time step.

4. A method according to claim 2 wherein a velocity of the first 3D ejectum is determined by taking the derivative of the displacement thereof.

5. A method according to claim 3 wherein an acceleration of the first 3D ejectum is determined by taking the derivative of the velocity thereof.

6. A method according to claim 4 wherein an acceleration of the first 3D ejectum is determined by taking the derivative of the velocity thereof.

7. A method of analyzing a plurality of three dimensional (3D) ejecta, the method comprising the steps of:

providing a three dimensional photography system comprising a first plurality of pulsed laser beams, a single trigger therefor, a stage for holding a dynamic event to be observed and whereat the first plurality of pulsed laser beams converge, a recombinant section for combining the first plurality of pulsed laser beams into a single pulsed laser beam after the stage, and a single image sensor for receiving the first plurality of pulsed laser beams as a like plurality of subframes for a second plurality of time steps, wherein each subframe corresponds to a respective to individual pulsed laser beam in each respective time step;

combining the first plurality subframes for each time step into a respective frame whereby a second plurality of frames is available;

creating a second plurality of N×N×M arrays of N×M pixels for each respective frame;

combining the second plurality of N×N×M arrays for each time step to create a three dimensional N×N×M×dT video of a dynamic event observed on the stage; and kinematically analyzing the three dimensional N×N×M×dT to video of the event determine dynamic characteristics of the plural 3D ejecta resulting from the dynamic event.

8. A method according to claim 7 further comprising the steps of selecting a 3D ejectum from the plurality of 3D ejecta, determining a number of voxels in the selected 3D ejecta and summing the voxels to determine a volume of the selected 3D ejectum.

9. A method according to claim 8 further comprising the steps of determining a density of the selected 3D ejectum and determining the mass of the selected 3D ejectum according to mass=density×volume.

10. A method according to claim 8 wherein each pulsed laser beam of the first plurality of pulsed laser beams is disposed in respective angular relationship with respect to the stage and comprising the step rotating each array by the angular difference between each pulsed laser beam.

11. A method according to claim 8 wherein each subframe of a successive time step is repeated as a projection of the respective subframe of the preceding time step to provide depth information about the 3D ejecta.

12. A method according to claim 11 comprising the step of outputting a three dimensional image of a 3D ejectum selected from the plurality of 3D ejecta only after all time steps of the second plurality of time steps have been considered.

13. A method of determining properties of a three dimensional (3D) ejectum resulting from a dynamic event, the method comprising the steps of:

providing a three dimensional photography system comprising a first plurality of pulsed laser beams, a single trigger therefor, a stage for holding a dynamic event expelling at least one 3D ejectum to be observed and whereat the first plurality of pulsed laser beams converge, a recombinant section for combining the first plurality of pulsed laser beams into a single pulsed laser beam after the stage, and a single image sensor having at least 8 megapixels and being configured for receiving the first plurality of pulsed laser beams as a like plurality of subframes for a second plurality of time steps, wherein each subframe corresponds to a respective to individual pulsed laser beam in each respective time step;

combining the first plurality subframes for each time step into a respective frame whereby a second plurality of frames is available;

creating a second plurality of N×N×M arrays of N×M pixels for each respective frame;

combining the second plurality of N×N×M arrays for each time step to create a three dimensional N×N×M×dT video of a dynamic event observed on the stage; and kinematically analyzing the three dimensional N×N×M×dT to video of the dynamic event determine dynamic characteristics and depth characteristics of at least one 3D ejectum resulting from the dynamic event.

14. A method according to claim 13 wherein the single image sensor has 2048×2048 pixels.

15. A method according to claim 14 wherein the single image sensor has at least 40 megapixels.

16. A method according to claim 14 wherein the first plurality of pulsed laser beams comprises four laser beams.

17. A method according to claim 14 wherein the first plurality of pulsed laser beams comprises a single pulsed source laser and at least one beam splitter to split the single pulsed source laser into the first plurality of pulsed laser beams.

18. A method according to claim 14 wherein each pulsed laser beam of the first plurality of pulsed laser beams originates from a respective pulsed source laser.

19. A method according to claim 18 wherein each the first plurality of pulsed source lasers have mutually different wavelengths.

20. A method according to claim 19 wherein the convergent section comprises a first plurality of dichroic mirrors for spectral separation of the corresponding pulsed laser beams.

* * * * *